(12) United States Patent
Bit-Babik et al.

(10) Patent No.: US 11,290,133 B2
(45) Date of Patent: Mar. 29, 2022

(54) PORTABLE COMMUNICATIONS DEVICES WITH REDUCED INTERFERENCE BETWEEN COMMUNICATION SYSTEMS

(71) Applicant: MOTOROLA SOLUTIONS, INC., Chicago, IL (US)

(72) Inventors: Giorgi Bit-Babik, Plantation, FL (US); Antonio Faraone, Fort Lauderdale, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 114 days.

(21) Appl. No.: 16/803,715

(22) Filed: Feb. 27, 2020

(65) Prior Publication Data
US 2021/0273663 A1    Sep. 2, 2021

(51) Int. Cl.
| | |
|---|---|
| H04W 72/04 | (2009.01) |
| H04W 72/12 | (2009.01) |
| H04L 5/00 | (2006.01) |
| H04B 1/40 | (2015.01) |
| H04B 1/00 | (2006.01) |

(52) U.S. Cl.
CPC ......... *H04B 1/0057* (2013.01); *H04B 1/0064* (2013.01)

(58) Field of Classification Search
None
See application file for complete search history.

(56) References Cited

U.S. PATENT DOCUMENTS

| | | | |
|---|---|---|---|
| 5,502,715 A | | 3/1996 | Penny |
| 5,719,792 A | * | 2/1998 | Bush .................. H03H 7/46 |
| | | | 327/552 |
| 2006/0092967 A1 | * | 5/2006 | Bergeron ............ H04L 12/2801 |
| | | | 370/463 |

(Continued)

FOREIGN PATENT DOCUMENTS

WO    2019103532 A1    5/2019

OTHER PUBLICATIONS

International Search Report and Written Opinion for Application No. PCT/US2021/015456 dated May 18, 2021 (14 pages).

*Primary Examiner* — Sai Aung
(74) *Attorney, Agent, or Firm* — Michael Best & Friedrich LLP

(57) ABSTRACT

Portable communications devices with reduced interference between communication systems. One embodiment provides a portable communications device including a first antenna, a second antenna, a first transceiver configured to operate over a first range of frequencies, a second transceiver configured to operate over a second range of frequencies and a third range of frequencies. The portable communications device includes an isolator circuit coupling the first transceiver and the second transceiver to the first antenna and the second antenna. The isolator circuit is configured to provide isolation between the first transceiver and the second transceiver when the second transceiver is operating in the second range of frequencies. The portable communications device further includes a bidirectional diplexer coupling the second transceiver to the isolator circuit. The bidirectional diplexer is configured to reduce an electrical transmission length when the second transceiver is operating over the third range of frequencies.

20 Claims, 11 Drawing Sheets

(56) References Cited

U.S. PATENT DOCUMENTS

| | | |
|---|---|---|
| 2010/0260082 A1 | 10/2010 | Lum et al. |
| 2012/0257519 A1* | 10/2012 | Frank .................... H04W 52/16 |
| | | 370/252 |
| 2015/0071137 A1* | 3/2015 | Thiam .................. H04B 7/0413 |
| | | 370/297 |
| 2016/0294334 A1 | 10/2016 | Piel et al. |
| 2017/0078738 A1* | 3/2017 | Wells ................. H04N 21/2385 |
| 2017/0163293 A1 | 6/2017 | Lee et al. |

\* cited by examiner

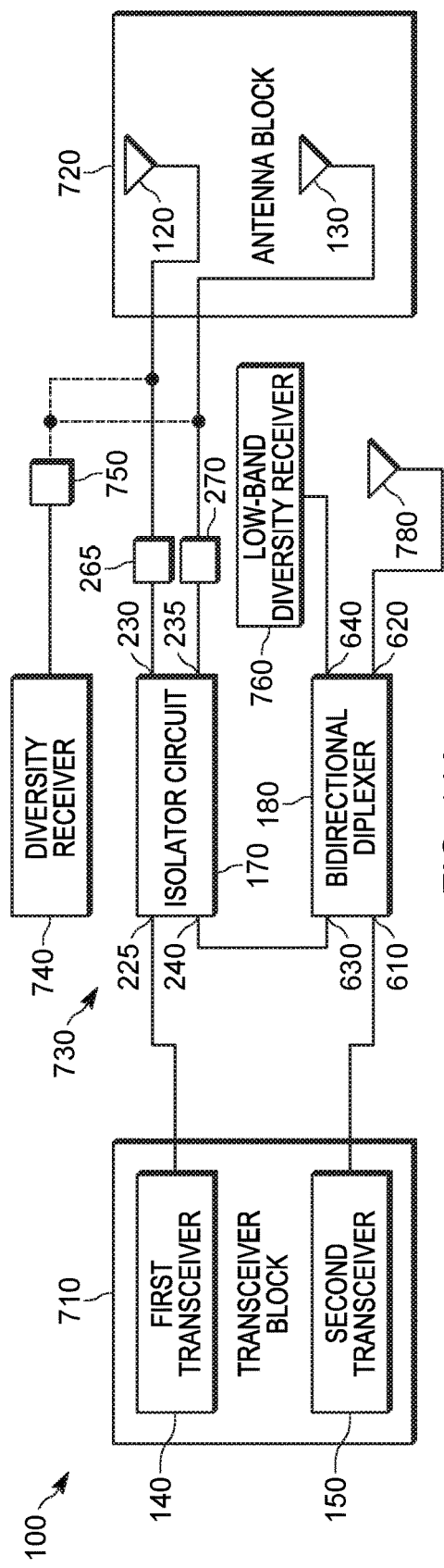
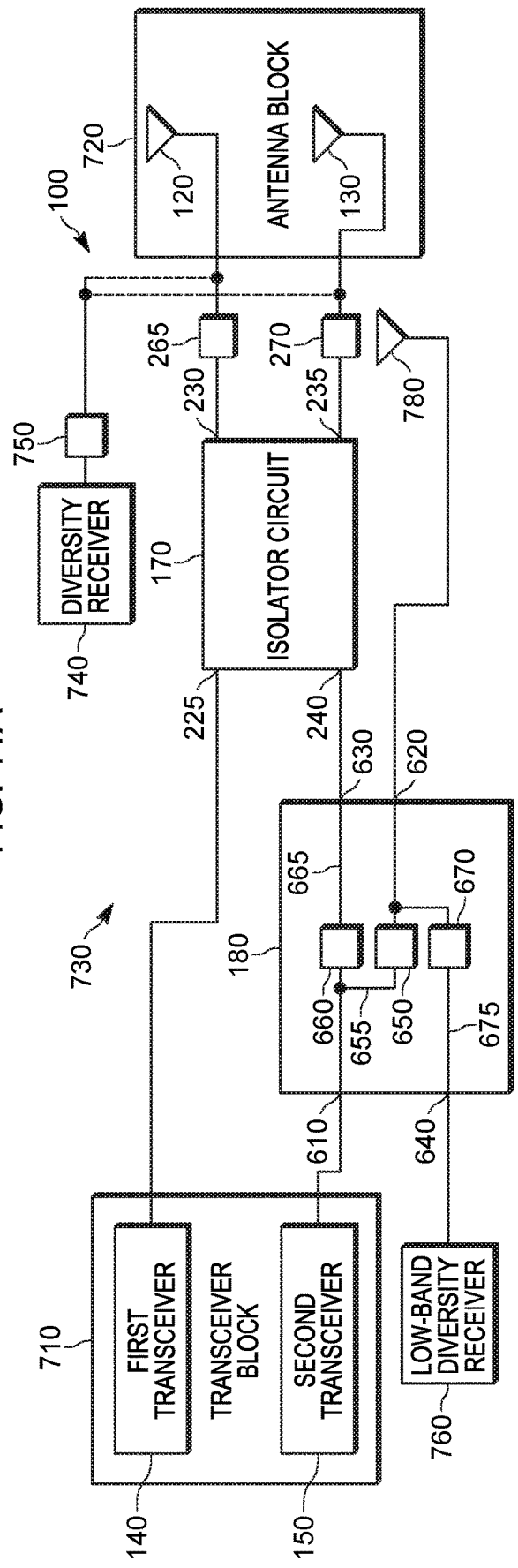
FIG. 11A
FIG. 11B

PORTABLE COMMUNICATIONS DEVICES WITH REDUCED INTERFERENCE BETWEEN COMMUNICATION SYSTEMS

BACKGROUND OF THE INVENTION

Portable wireless communications devices operated by public safety organizations (for example, police departments, fire departments, and the like) sometimes operate over multiple communication systems. For example, portable two-way radios or smart telephones issued to public safety officers may simultaneously operate over a land mobile radio (LMR) wireless communication system and a long-term evolution (LTE) wireless communication system.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 11A and 11B schematically illustrates the bidirectional diplexer of FIG. 6 implemented in the portable communications device of FIG. 1 in accordance with some embodiments.

Figure 1:
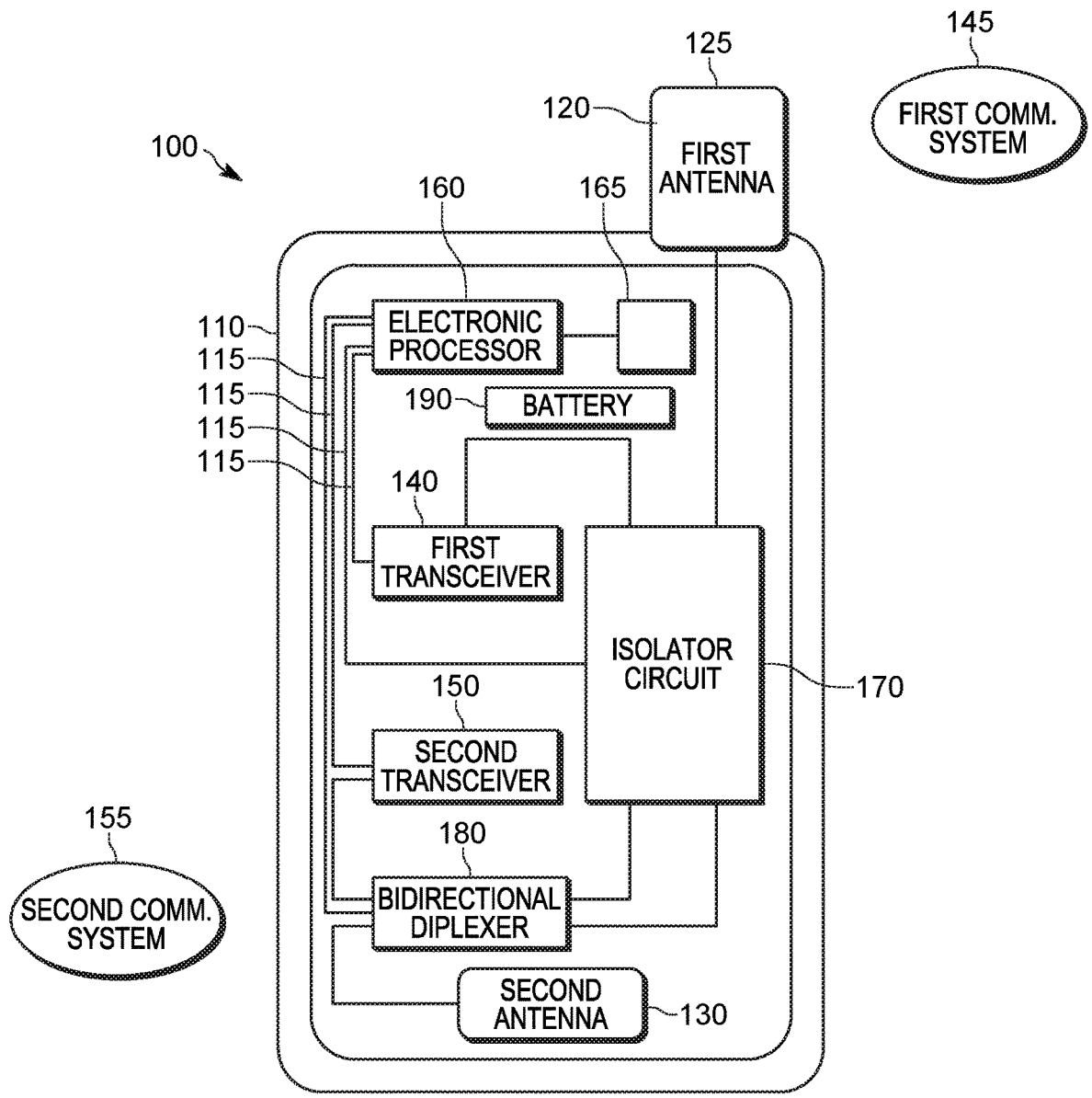
FIG. 1 schematically illustrates a portable communications device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted above, portable two-way radios or smart telephones may be configured to operate over both a land mobile radio (LMR) wireless communication system and a long-term evolution (LTE) wireless communication system. Each communication system may operate in one or more preconfigured frequency bands. For example, an LMR system sometimes operates in one or more of a 7/800 Megahertz (MHz) band (760-870 MHz), a very high frequency (VHF) band (136-174 MHz), and an ultra high frequency (UHF) band (380-520 MHz), while an LTE system typically operates in one of three bands: a 699-960 MHz band (referred to as the low-band), a 1710-2200 MHz band (referred to as the mid-band), and a 2500-2690 MHz band (referred to as the high-band). The portable communications devices may use separate radio frequency (RF) transceivers and associated antennas, for each communication system. The transceivers operating in overlapping frequency bands and/or non-overlapping frequency bands may interfere with each other due to substantial RF coupling between the respective antennas since they are proximate to each other within the same device, sharing the device metallic structures which may act as their respective counterpoise. This RF interference may decrease the communication quality of the portable communications devices, as well as cause exceedance of regulatory limits on spurious RF emissions.

Accordingly, there is a need for reducing interference between different communication systems within a communications device.

One embodiment provides a portable communications device including a first antenna, a second antenna, a first transceiver configured to operate over a first range of frequencies, and a second transceiver configured to operate over a second range of frequencies and a third range of frequencies. The portable communications device also includes a transmission path connecting the first transceiver and the second transceiver to the first antenna and the second antenna and an isolator circuit provided on the transmission path. The isolator circuit is configured to provide isolation between the first transceiver and the second transceiver when the second transceiver is operating in the second range of frequencies. The portable communications device also includes a bidirectional diplexer provided on the transmission path. The bidirectional diplexer is coupled to the second transceiver and the isolator circuit and configured to reduce an electrical transmission length when the second transceiver is operating over the third range of frequencies.

Another embodiment provides a portable communications device including a first antenna, a second antenna, a first transceiver configured to operate over a first range of frequencies, a second transceiver configured to operate over a second range of frequencies and a third range of frequencies. The portable communications device includes an isolator circuit coupling the first transceiver and the second transceiver to the first antenna and the second antenna. The isolator circuit is configured to provide isolation between the first transceiver and the second transceiver when the second transceiver is operating in the second range of frequencies. The portable communications device further includes a bidirectional diplexer coupling the second transceiver to the isolator circuit. The bidirectional diplexer is configured to reduce an electrical transmission length when the second transceiver is operating over the third range of frequencies.

FIG. 1 illustrates a portable communications device 100 according to one example embodiment. The portable communications device 100 includes a housing 110, a first antenna 120, a second antenna 130, a first transceiver 140, a second transceiver 150, an electronic processor 160, an isolator circuit 170, a bidirectional diplexer 180, and a battery 190. The portable communications device 100 may include more or fewer components than those illustrated in FIG. 1 and may perform functions other than those described herein. The portable communications device 100 is, for example, a mobile two-way radio, a portable two-way radio, a smart telephone, a smart wearable device (for example, a smart watch), a tablet computer, and the like.

The first transceiver 140, via the first antenna 120 and the second antenna 130, enables communication between the portable communications device 100 and other portable communications devices 100, application servers, call controllers, command centers, and the like over a first wireless communication system 145. In the example illustrated, the first wireless communication system 145 is an LMR system operating in the 7/800 MHz band. In one example, the first transceiver 140 is an LMR transceiver and is configured to operate over a first range of frequencies (for example, 760-870 MHz). In some embodiments, the first transceiver 140 may include separate transmitting and receiving components, for example, a first transmitter and a first receiver.

The second transceiver 150, via the first antenna 120 and the second antenna 130, enables communication between the portable communications device 100 and other portable communications devices 100, an application server, a call controller, command centers, and the like over a second wireless communication system 155. In the example illustrated, the second wireless communication system 155 is an LTE system that may be selectively and/or concurrently operated in the low-band (LB), the mid-band (MB), and/or the high-band (HB). In one example, the second transceiver 150 is an LTE transceiver and is configured to operate over a second range of frequencies (for example, LB frequencies) and a third range of frequencies (for example, MB frequencies and/or HB frequencies). The mid-band and the high-band may be collectively referred to as the mid-high band (MHB). In some embodiments, the second transceiver 150 includes separate transmitting and receiving components, for example, a second transmitter and a second receiver.

The first antenna 120 may be located at the top of the portable communications device 100 and may be referred to as the top antenna. In some embodiments, the first antenna 120 may be provided in an antenna housing 125 that extends upward from the housing 110 of the portable communications device 100. The second antenna 130 may be located internal to, for example, at the bottom of the portable communications device 100 within the housing 110 of the portable communications device 100 and may be referred to as the internal or bottom antenna.

The electronic processor 160 is coupled to the first transceiver 140, the second transceiver 150, the isolator circuit 170, and the bidirectional diplexer 180 over control and/or data buses 115. The electronic processor 160 provides controls signals over the control and/or data buses 115 to control the first transceiver 140, the second transceiver 150, the isolator circuit 170, and the bidirectional diplexer 180 as further provided below. In some embodiments, the electronic processor 160 is implemented as a microprocessor with separate memory, for example, a memory 165. In other embodiments, the electronic processor 160 is implemented as a microcontroller or digital signal processor (with memory 165 on the same chip). In other embodiments, the electronic processor 160 is implemented using multiple electronic processors. In addition, the electronic processor 160 may be implemented partially or entirely as, for example, a field programmable gate array (FPGA), an application specific integrated circuit (ASIC), and the like and the memory 165 may not be needed or be modified accordingly. In the example illustrated, the memory 165 includes non-transitory, computer readable memory that stores instructions that are received and executed by the electronic processor 160 to carry out the functionality of the portable communications device 100. The memory 165 may include, for example, a program storage area and a data storage area. The program storage area and the data storage area may include combinations of different types of memory, for example, read-only memory and random-access memory.

The isolator circuit 170 provides the ability to reduce the RF coupling between the transceivers 140 and 150 over at least one frequency swath overlapping the first range of frequencies 760-870 MHz. The isolator circuit 170 thereby allows the transceivers 140 and 150 to operate concurrently with reduced RF interference levels. Concurrent operation with reduced interference levels increases the communication quality of the portable communications device 100. The reduced RF interference levels provided by the isolator circuit 170 also helps facilitate compliance with regulatory limits on spurious RF emissions.

The bidirectional diplexer 180 provides a first frequency-dependent RF connection between the second transceiver 150 and the second antenna 130, a second frequency-dependent RF connection between the second transceiver 150 and the isolator circuit 170, and a third frequency-dependent RF connection between the second antenna 130 and the isolator circuit 170. These frequency-dependent RF connections may be generally classified as low-pass connections, high-pass connections, and band-pass connections, relative to suitable frequency thresholds. The frequency-dependent RF connections provided by the bidirectional diplexer 180 can be controlled by the electronic processor 160 over control and/or data buses 115.

A low-pass connection is formed by selecting a suitable frequency threshold located between the LB and the MHB. In the low-pass connection, time-harmonic RF signals generated within the LB cross the low-pass connection with a desired signal attenuation, while time-harmonic RF signals generated within the MHB do not cross the low-pass connection or cross the low-pass connection with a substantially higher signal attenuation that the LB RF signals. A high-pass connection is formed by selecting a suitable frequency threshold located between the LB and the MHB. In the high-pass connection, time-harmonic RF signals generated within the MHB cross the high-pass connection with a desired signal attenuation, while time-harmonic RF signals generated within the LB do not cross the high-pass connection or cross the high-pass connection with a substantially higher signal attenuation that the MHB RF signals. A band-pass connection is formed by selecting suitable pass-band frequency thresholds, one on each side of the MHB (or LB). In the band-pass connection, time-harmonic RF signals within the MHB (or LB) cross the band-pass connection with a desired signal attenuation, while time-harmonic RF signals generated within the LB (or MHB) do not cross the band-pass connection or cross the band-pass connection with a substantially higher signal attenuation than the MHB (or LB) signals.

The battery 190 provides operating power to the electrical components of the portable communications device 100. The battery 190 may be a battery pack or one or more battery cells provided in a battery compartment. In some embodiments, the portable communications device 100 may be powered by other power sources in addition to or in place of the battery 190.

In the embodiment illustrated in FIG. 1, the isolator circuit 170 is coupled between the first antenna 120, the first transceiver 140, and the bidirectional diplexer 180. The isolator circuit 170 decreases the RF coupling between the first transceiver 140 and the second transceiver 150 in the LB frequency range, where both LMR and LTE communication systems may operate in overlapping and/or non-overlapping frequency swaths.

As discussed above, the first transceiver 140 and the second transceiver 150 may also operate in additional frequency bands other than the overlapping LB frequency ranges. In the United States, for example, the first transceiver 140 could also operate in the VHF band and/or in the UHF band, while the second transceiver 150 may also operate in the MB and/or HB frequency ranges. However, there is substantial frequency separation between the VHF/UHF bands and the LB/MHB and between the MHB and the VHF/UHF and the 7/800 MHz bands. In these instances where the first transceiver 140 and the second transceiver 150 are operating in far-apart frequency ranges, potential mutual RF interference is sufficiently mitigated using conventional frequency-domain RF filtering (e.g., pass-band filter and/or duplexers) at the inputs of the first transceiver 140 and the second transceiver 150.

In many circumstances, use of the isolator circuit 170 to reduce RF coupling between the first transceiver 140 and the second transceiver 150 is desirable only when the first transceiver 140 and the second transceiver 150 are operating in overlapping or close frequency ranges (for example, when the first transceiver 140 operates in the 7/800 MHz band and the second transceiver 150 operates in the LB). To avoid signal degradation by the isolator circuit 170 when the first transceiver 140 is operating in the VHF/UHF bands and/or the second transceiver 150 is operating in the MHB, bypass RF switches (not shown) controlled by the electronic processor 160 may be provided to route RF signals through RF transmission lines that are external to the isolator circuit 170. The bypass RF switches are controlled by the electronic processor 160 via the control and/or data buses 115. However, the bypass RF switches add to the cost of the portable communications device 100, take up excessive space, and limit performance of the portable communications device 100 (for example, by impeding the concurrent use of LB and MHB frequencies, by the second transceiver 150, according to an LTE carrier-aggregation operating mode intended to increase data throughput in the second wireless communication system 155). As further discussed below, the bidirectional diplexer 180 provides a suitable alternative for the RF switches to bypass the isolator circuit 170 during non-overlapping operation of the first transceiver 140 and the second transceiver 150.

Figure 2:
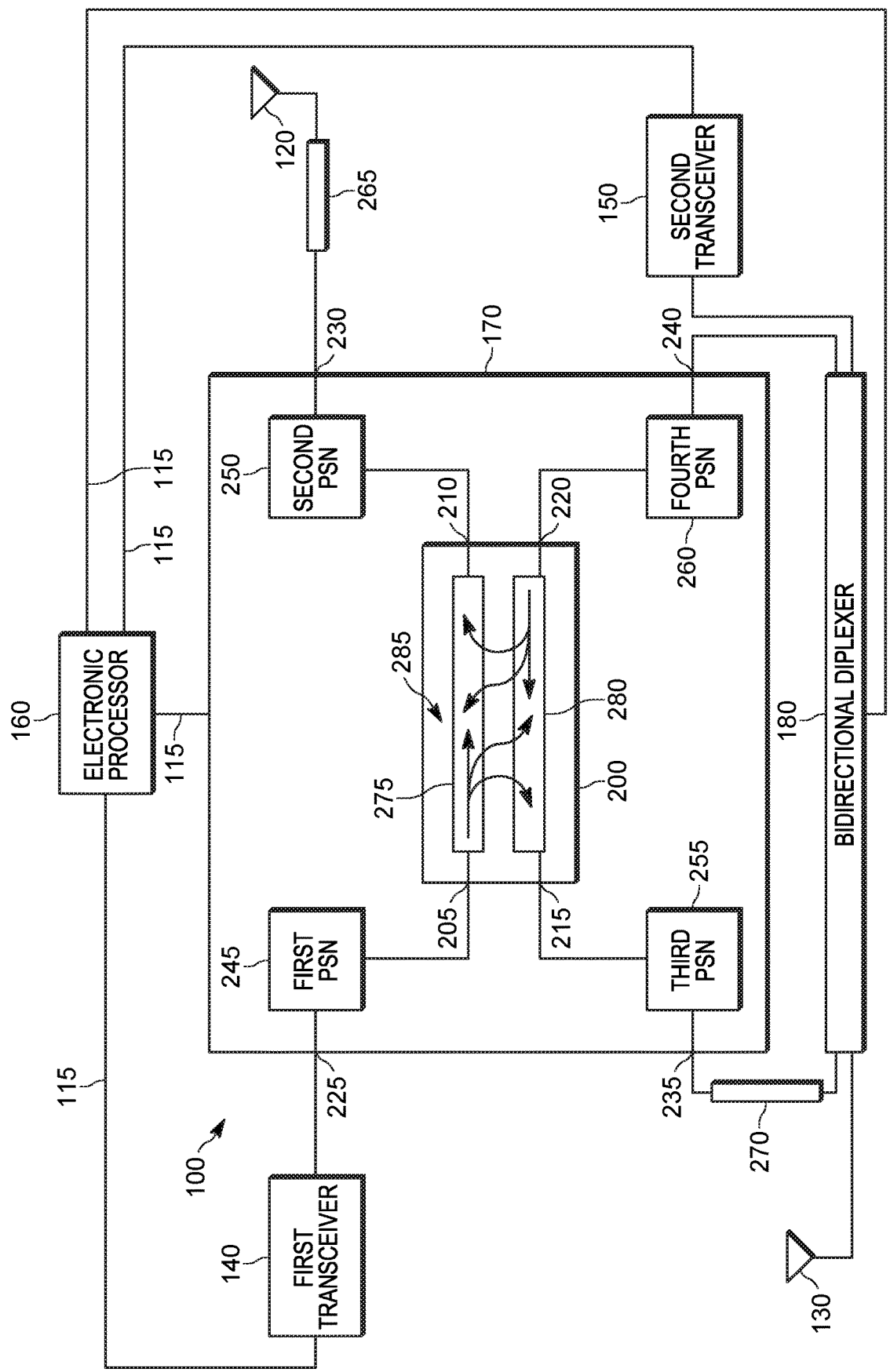
FIG. 2 illustrates a detailed schematic of an isolator circuit of the portable communications device of FIG. 1 in accordance with some embodiments.

With reference to FIG. 2, the isolator circuit 170 includes an RF coupler 200. The RF coupler 200 includes a first coupler port 205, a second coupler port 210, a third coupler port 215, and a fourth coupler port 220 (referred to as the coupler ports 205, 210, 215, 220). The isolator circuit 170 includes a first isolator port 225, a second isolator port 230, a third isolator port 235, and a fourth isolator port 240 (referred to as the isolator ports 225, 230, 235, 240). A first phasor-shaping network (PSN) 245 is coupled between the first isolator port 225 and the first coupler port 205. A second PSN 250 is coupled between the second isolator port 230 and the second coupler port 210. A third PSN 255 is coupled between the third isolator port 235 and the third coupler port 215. A fourth PSN 260 is coupled between the fourth isolator port 240 and the fourth coupler port 220. The first PSN 245, the second PSN 250, the third PSN 255, and the fourth PSN 260 are referred to as the PSNs 245, 250, 255, 260. A PSN generally refers to a multi-port RF network employed to shape the phasors (that is, alter respective magnitudes and phases of the multi-port RF network) of RF signals being reflected by and signals crossing the multi-port RF network.

The first isolator port 225 is coupled to the first transceiver 140. The second isolator port 230 is coupled to the first antenna 120 through a first RF transmission line 265. The third isolator port 235 is coupled to the bidirectional diplexer 180 through a second RF transmission line 270, and the fourth isolator port 240 is coupled to the second transceiver 150 through the bidirectional diplexer 180.

In the example illustrated, the RF coupler 200 is realized using coupled RF transmission lines 275 and 280. RF signal flow is partially visualized by arrows 285 in FIG. 2. As shown, an RF signal injected at any of the coupler ports 205, 210, 215, 220 may produce output RF signals at all of the other coupler ports 205, 210, 215, 220. For example, an RF signal injected at the first coupler port 205 at one end of the coupled RF transmission line 275 produces a direct-path output at the opposite end of the coupled RF transmission line 275 corresponding to the second coupler port 210, as well as a reverse coupled-path RF signal at a near end of the coupled RF transmission line 280 corresponding to the third coupler port 215 and a forward coupled-path RF signal at a far end of the coupled RF transmission line 280 corresponding to the fourth coupler port 220. The isolator circuit 170 is therefore configured to produce disruptive superposition of all RF signals flowing from the first transceiver 140 to the second transceiver 150 and vice versa. The RF signal distribution caused by the RF coupler 200 is advantageously exploited to achieve substantial cancellation of RF signals flowing between the first transceiver 140 and the second transceiver 150, as further described below.

In this example, the length of the RF coupler 200 is selected to not exceed one quarter of a wavelength of the RF signals in the LB to have the RF coupling and the magnitude of the RF signal transfer between the coupled RF transmission lines 275 and 280 be an increasing function of frequency in the VHF/UHF bands. As a consequence, the RF attenuation between the first transceiver 140 and the first antenna 120 due to RF signal coupling between coupled RF transmission lines 275 and 280 is decreased. The decreased RF attenuation allows concurrent operation of the first transceiver 140 in the VHF, UHF, and 7/800 MHz bands. The RF coupler 200 also provides reduced interference between the first transceiver 140 and the second transceiver 150 when the second transceiver 150 is operating in LB, which overlaps the 7/800 MHz band of the first transceiver 140. The reduced RF attenuation between the first transceiver 140 and the first antenna 120 allows the first antenna 120 to be designed as a multi-band antenna operating in the VHF, UHF, and the 7/800 MHz LMR bands.

The first antenna 120 can be provided external to the housing 110 with sufficient length to provide desired performance even at frequencies (for example, within the VHF band), where the operating free-space wavelength is much larger than the dimensions of the portable communications device 100.

However, when the second transceiver 150 is operating in the MHB, the performance of the second transceiver 150 is degraded due to RF attenuation introduced by the isolator circuit 170. Additionally, the large electrical length (that is, the physical length of an RF signal path divided by the RF signal wavelength in the RF signal propagation medium) between the second transceiver 150 and the second antenna 130 may further degrade performance of the second transceiver 150 in the MHB. The large electrical length limits matched-impedance bandwidth where the second transceiver 150 operates efficiently in the MHB in the second wireless communication system 155.

The bidirectional diplexer 180 provides low-attenuation RF signal paths between the second transceiver 150 and the second antenna 130 and between the second transceiver 150 and the isolator circuit 170. When operating in MHB, the low-attenuation RF signal path is provided using a high-pass or band-pass RF circuit between the second transceiver 150 and the second antenna 130. When operating in LB, the low-attenuation RF signal path is provided using low-pass or band-pass RF circuit between the second transceiver 150 and the isolator circuit 170. The bidirectional diplexer 180 thereby allows concurrent operation of the second transceiver 150 in the LB and MHB with low RF attenuation. At the same time, the isolator circuit 170 provides reduced RF interference between the first transceiver 140 and the second transceiver 150 when the second transceiver 150 is operating in the LB.

The second antenna 130 may be designed to be a multi-band antenna operating in the LB and the MHB. The second antenna 130 can be small to provide sufficient performance at MHB frequencies, where the operating free-space wavelength is about the size of the portable communications device 100. The second antenna 130 can therefore be placed internal to the housing 110 without requiring a separate MHB antenna.

With continued reference to FIG. 2, the RF coupler 200 provides several RF signal paths between the first transceiver 140, the second transceiver 150, the first antenna 120, and the second antenna 130. These RF signal paths may produce RF interference between the first transceiver 140 and the second transceiver 150, for example, when the first transceiver 140 is operating in the 7/800 MHz band. The RF interference may be produced due to three primary RF interference paths between the first transceiver 140 and the second transceiver 150 and multiple secondary RF interference paths between the first transceiver 140 and the second transceiver 150. A first and second primary RF interference paths include the RF coupling path between the first antenna 120 and the second antenna 130, whereas a third primary RF interference path is caused only by an RF signal path provided by the RF coupler 200.

The first primary RF interference path between the first transceiver 140 and the second transceiver 150, for example, when the first transceiver is transmitting in the 7/800 MHz band, is through the first PSN 245, the first coupler port 205, the second coupler port 210, the second PSN 250, the first RF transmission line 265, the first antenna 120, the second antenna 130, the bidirectional diplexer 180, the second RF transmission line 270, the third PSN 255, the third coupler port 215, the fourth coupler port 220, the fourth PSN 260, and the bidirectional diplexer 180. The second primary RF interference path between the first transceiver 140 and the second transceiver 150 is through the first PSN 245, the first coupler port 205, the third coupler port 215, the third PSN 255, the second RF transmission line 270, the bidirectional diplexer 180, the second antenna 130, the first antenna 120, the first RF transmission line 265, the second PSN 250, the second coupler port 210, the fourth coupler port 220, the fourth PSN 260, and the bidirectional diplexer 180. A third primary RF interference path between the first transceiver 140 and the second transceiver 150 is through the first PSN 245, the first coupler port 205, the fourth coupler port 220, the fourth PSN 260, and the bidirectional diplexer 180. Secondary RF interference paths may also be present due to multiple RF signal reflections occurring between the various elements forming in the isolator circuit 170 and the bidirectional diplexer 180.

Figure 3A:
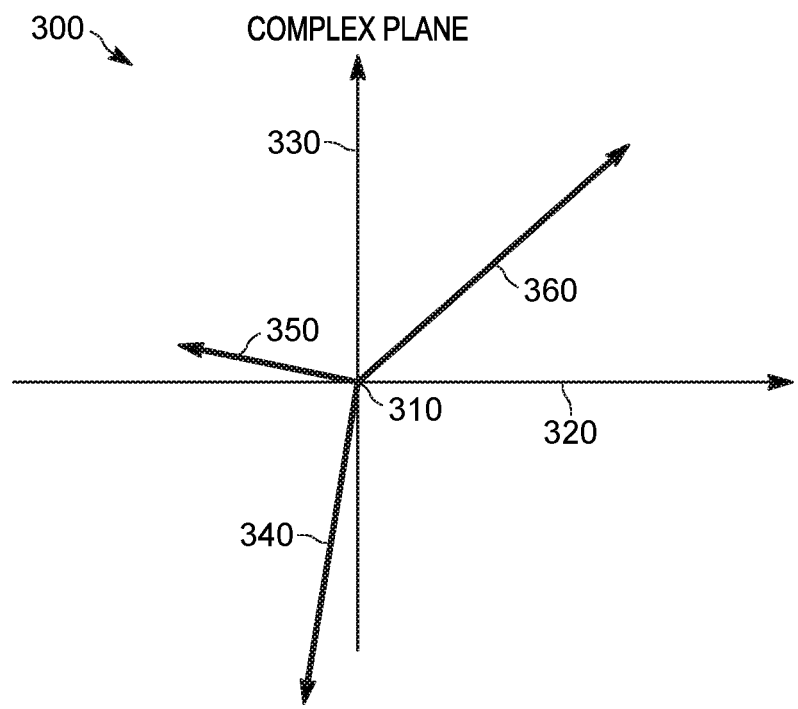
FIGS. 3A and 3B are graphs showing primary radio frequency interference paths signal phasors and the resulting RF interference signal phasor in accordance with some embodiments.
Figure 3B:
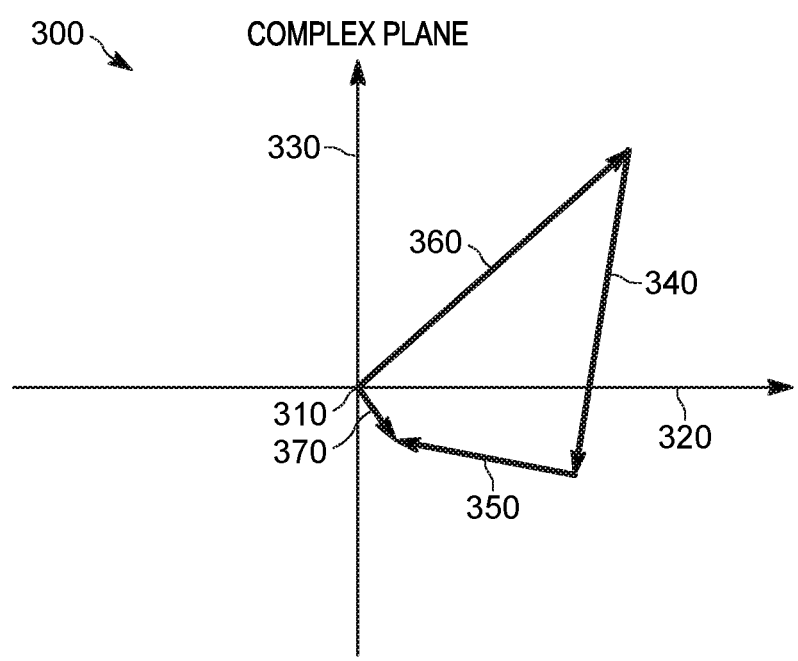

Each primary RF interference path corresponds to an RF signal flowing from the interfering transceiver to the interfered transceiver. Any arbitrary time-harmonic signal can be described through a vector representing magnitude and phase of the corresponding RF signal phasor on a complex plane, so the resulting interfering RF signal is the vector sum of the three vectors associated with the RF signals flowing through each of the primary RF interference paths and the vectors associated with secondary RF interference paths. The isolator circuit 170 and the bidirectional diplexer 180 may be jointly optimized to minimize such a vector sum over a desired frequency range. In one example, optimization may include sizing and arranging the three primary RF interference path vectors to form, as close as possible, a triangle, as illustrated in FIGS. 3A and 3B. FIG. 3A illustrates a complex phasor plane 300 including orthogonal axes that cross the origin 310, with a real axis 320 and an imaginary axis 330. The three primary interference path vectors 340, 350, 360 are shown on the complex phasor plane 300. FIG. 3B illustrates the resulting vector sum 370 of the three primary interference path vectors 340, 350, 360. The resulting vector sum 370 represents a residual RF interference signal between the first transceiver 140 and the second transceiver 150 as only the three primary RF interference paths are considered for simplicity in this example.

The PSNs 245, 250, 255, 260 may incorporate lumped and distributed RF circuit elements and transmission lines. The first PSN 245 is, for example, an LMR matching network and includes reactive impedance elements (for example, capacitors, inductors, and the like) connected between an input and an output of the first PSN 245. The first PSN 245 may include RF switches and tunable RF components (voltage-controlled capacitors, variable phase shifter, and the like). The first PSN 245 can be controlled by the electronic processor 160 through the control and/or data buses 115 to be reconfigured to provide desirable phasor-shaping behaviors for maximum power transfer between the first transceiver 140 and a corresponding transceiver of another portable communications device 100 of the first wireless communication system 145. The fourth PSN 260 is, for example, an LTE matching and tuning network and similarly includes impedance elements connected between an input and an output of the fourth PSN 260. The fourth PSN 260 may include RF switches and tunable RF components (voltage-controlled capacitors, variable phase shifter, and the like). The fourth PSN 260 can be controlled by the electronic processor 160 through the control and/or data buses 115 to be reconfigured to provide desirable phasor-shaping behaviors for maximum power transfer between the second transceiver 150 and a corresponding transceiver of another portable communications device 100 of the second wireless communication system 155.

The second PSN 250 and the third PSN 255 may be optimized to effect the RF interference cancellation in the LB. The second PSN 250 and the fourth PSN 260 provide a phasor-shaping functionality that produces desirable magnitude and phase alteration to RF signals flowing through RF interference paths to minimize the resulting RF interference signal magnitude. The phasor-shaping functionalities introduced by the bidirectional diplexer 180, the first RF transmission line 265, and the second RF transmission line 270 may also be optimized for RF interference cancellation in the LB. The low-pass, high-pass, and band-pass filters of the bidirectional diplexer 180 may be selected to provide phasor-shaping functionality that is usefully optimized to minimize resulting RF interference signal magnitude.

In some embodiments, some or all of the functionality of the PSNs 245, 250, 255, 260 is performed by the first transceiver 140, the second transceiver 150, the first antenna 120, and/or the second antenna 130. Additionally, this approach avoids placement of tunable components under potentially disruptive large RF signal interference conditions because the isolator circuit 170 provides sufficient attenuation to the resulting RF interference signal. These large RF signal conditions may produce unacceptably large spurious signals and may physically damage circuital components.

FIGS. 1 and 2 illustrate only one example embodiment of the portable communications device 100 and the isolator circuit 170. The portable communications device 100 may include more or fewer components than those illustrated in FIG. 2 and may perform functions other than those described herein. The isolator circuit 170 may be implemented in different ways to provide isolation between the first transceiver 140 and the second transceiver 150.

Figure 4:
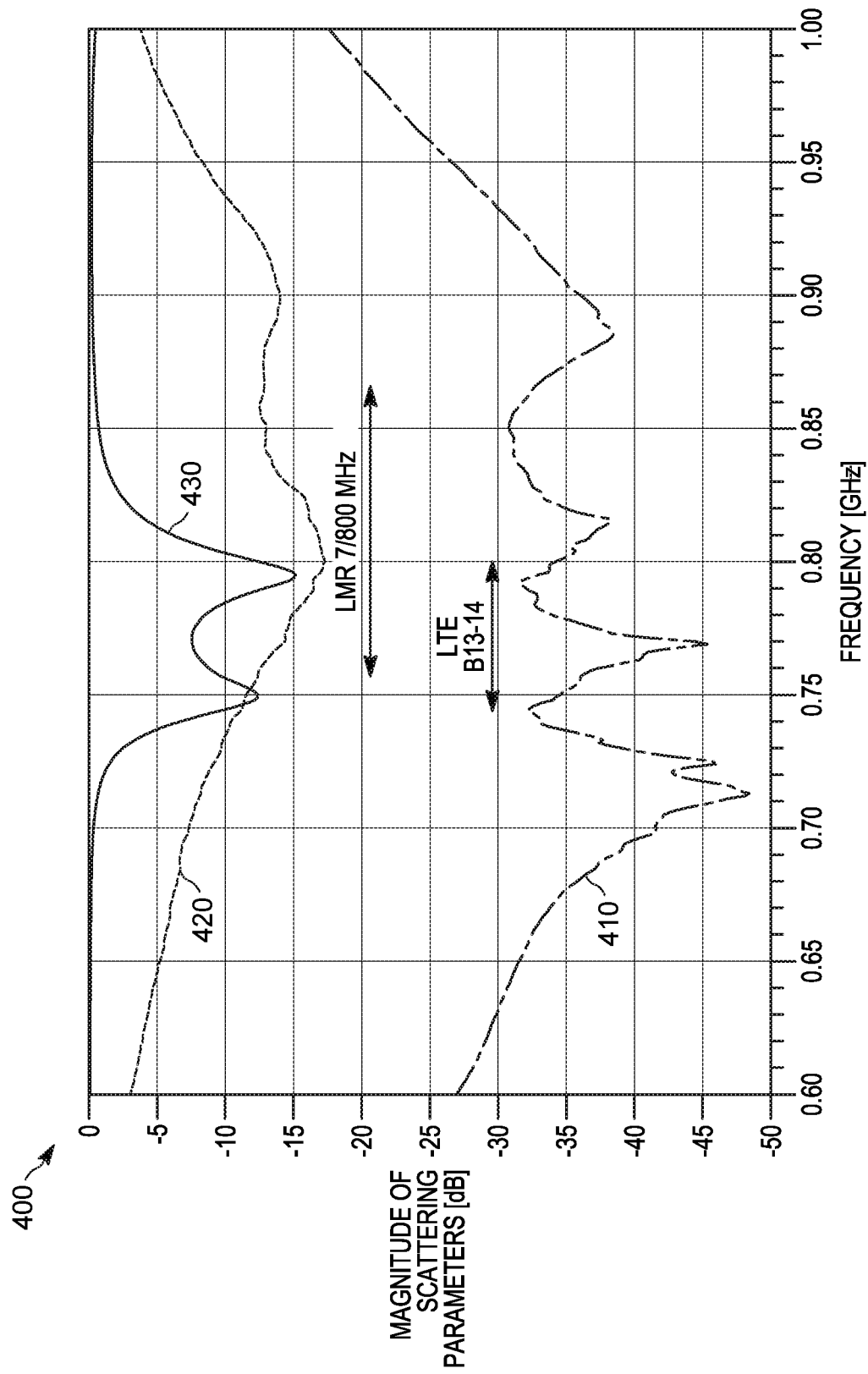
FIG. 4 is a graph showing the isolation between a first transceiver and a second transceiver of the portable communications device of FIG. 1 in accordance with some embodiments.

An example of RF interference cancellation achievable using the isolator circuit 170, across a frequency range encompassing the LB and the 7/800 MHz band is provided in FIG. 4. The plots 400, including decibel (dB)-scale magnitudes of the scattering parameters between respective input ports of the first transceiver 140 and the second transceiver 150, show the plot 410 illustrating the RF isolation between the first transceiver 140 and the second transceiver 150, the plot 420 illustrating the return loss at the first transceiver 140 input and the plot 430 illustrating the return loss at the second transceiver 150 input. The plots 400 illustrate a situation in which the bidirectional diplexer 180 is not employed. That is, the third PSN 255 is coupled to the second antenna 130 through the second RF transmission line 270, and the fourth PSN 260 is directly coupled to the second transceiver 150. In this example, the return loss for the first transceiver 140 is optimized for the LMR 7/800 MHz band and the return loss for the second transceiver 150 is optimized for the LTE Bands 13 and 14 encompassing the frequency range 746-798 MHz.

The isolator circuit 170 provides 30 dB or more RF isolation between the first transceiver 140 and the second transceiver 150 across the LB and the 7/800 MHz band, which is significantly higher than the isolation that would be typically provided by optimizing design of the antennas and optimizing placement of the antennas on the portable communications device 100. Optimizing design and placement of the antennas provides approximately 10 dB RF isolation between the first transceiver 140 and the second transceiver 150.

Figure 5A:
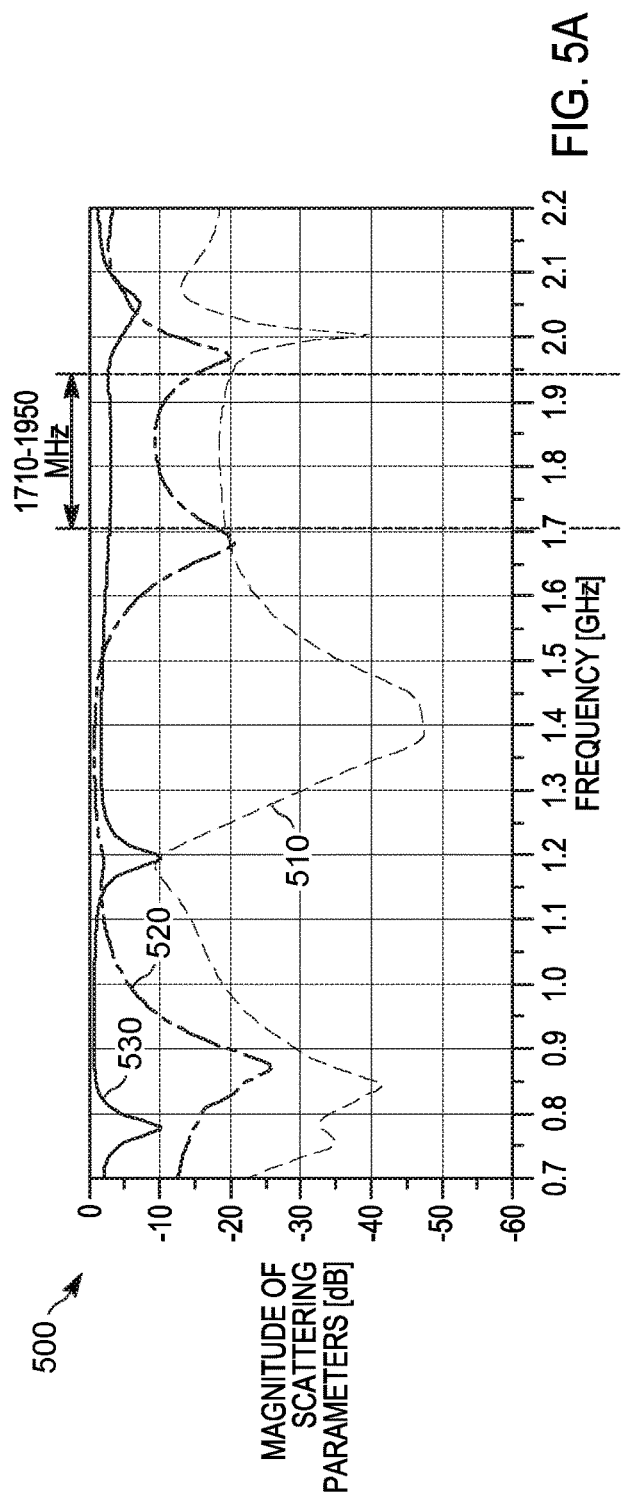
FIGS. 5A and 5B show scattering parameters at input ports of the first transceiver and the second transceiver and fractional share of RF power delivered to a first antenna and a second antenna of the portable communications device of FIG. 1 in accordance with some embodiments.
Figure 5B:
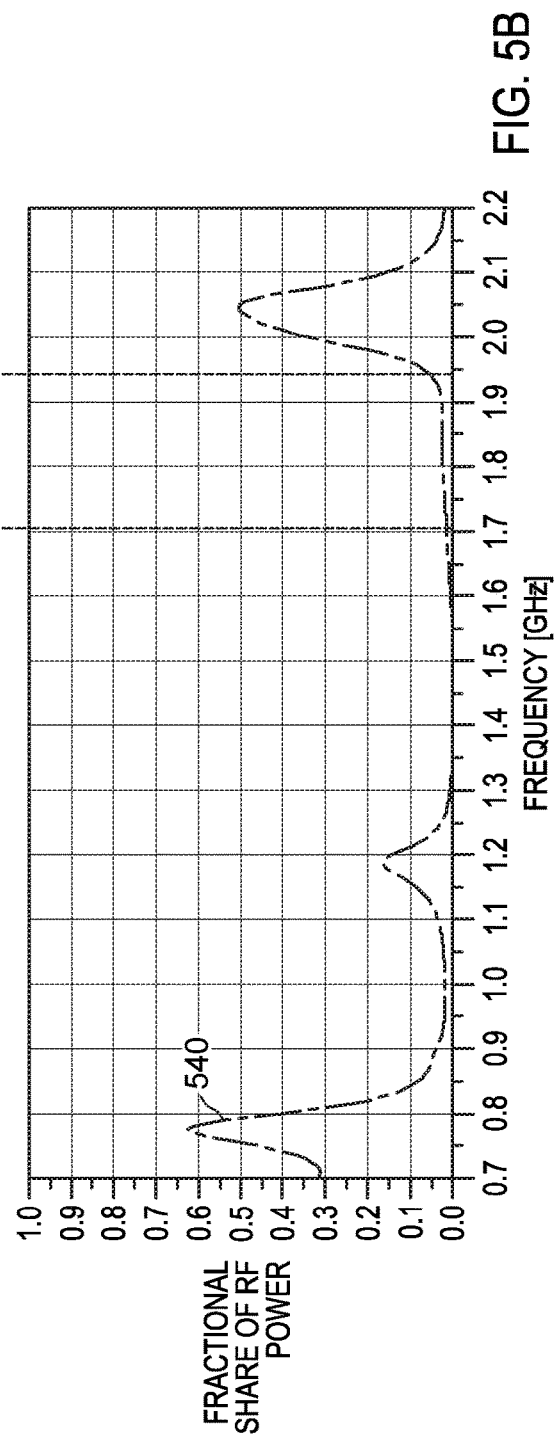

Although the isolator circuit 170 works well to provide substantially increased RF isolation between the first transceiver 140 and the second transceiver 150 across the LB and the 7/800 MHz band, the isolator circuit 170 increases the electrical length of the RF signal path between the second transceiver 150 and the second antenna 130. This increased electrical transmission length attenuates the RF signals and reduces the attainable return loss bandwidth at the input of the second transceiver 150 when the second transceiver 150 is operating in the MHB. In another example where the bidirectional diplexer 180 is not employed, FIG. 5 illustrates the scattering parameters between respective input ports of the first transceiver 140 and the second transceiver 150 and the RF power concurrently delivered to the first antenna 120 and the second antenna 130 by the second transceiver 150 when the second transceiver 150 is operating across the LB and the MB. FIG. 5A provides the dB-scale plots 500 including optimized RF isolation plot 510 between the first transceiver 140 and the second transceiver 150, the optimized return loss plot 520 at the first transceiver 140 input, and the optimized return loss 530 at the second transceiver 150 input. These plots indicate good performances in the LB. However, between 1710-1950 MHz in the MB, considerable impedance mismatch may occur at the second transceiver 150 input. Plot 540 in FIG. 5B illustrates the fractional share of available RF power concurrently delivered to the first antenna 120 and the second antenna 130 by the second transceiver 150. As shown in FIG. 5B, the share of RF power is as desired in the LB, but is significantly smaller than the share that would be expected based on the corresponding return loss plot 530, indicating that significant RF attenuation occurs between 1710-1950 MHz. Based on the above, the large electrical path and the RF attenuation through the isolator circuit 170 yield a narrowband performance characterized by a sharp peak of the plot 540 at about 2050 MHz, while the reduced percentage of available RF power delivered to first antenna 120 and the second antenna 130 decreases the call quality and operational range of the portable communications device 100 within the second wireless communication system 155 between 1710-1950 MHz.

Accordingly, there is a need to reduce the electrical length between the second transceiver 150 and the second antenna 130 and to avoid excessive RF attenuation between the second transceiver 150 and the second antenna 130 in the MHB while preserving the high RF isolation provided by the isolator circuit 170 between the first transceiver 140 and the second transceiver 150 in the LB. In some embodiments, the electrical length is reduced and excessive RF attenuation is avoided by using the bidirectional diplexer 180.

Figure 6:
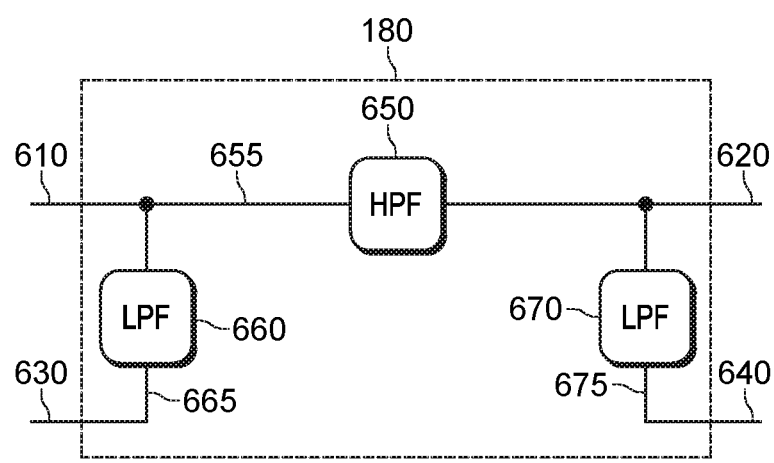
FIG. 6 schematically illustrates a bidirectional diplexer in accordance with some embodiments.

FIG. 6 illustrates the bidirectional diplexer 180 according to one example embodiment. The bidirectional diplexer 180 may be provided in the portable communications device 100 to allow for efficient operation in the MHB while preserving the isolation provided by the isolator circuit 170 between the first transceiver 140 and the second transceiver 150 in the LB. The bidirectional diplexer 180 may be used to reduce the electrical length of the RF signal path between the second transceiver 150 and the second antenna 130 when the second transceiver 150 is operating over the third range of frequencies (that is, the MHB). The bidirectional diplexer 180 is a four-port RF network including low-pass and high-pass branches. The bidirectional diplexer 180 includes a first diplexer port 610, a second diplexer port 620, a third diplexer port 630, and a fourth diplexer port 640.

A first frequency-selective circuit 650 is coupled between the first diplexer port 610 and the second diplexer port 620. In the example illustrated, the first frequency-selective circuit 650 is a high-pass filter (HPF) that allows transmission of RF signals at the MHB frequencies, but prevents or substantially rejects the transmission of RF signals at LB frequencies. The circuit branch including the first frequency-selective circuit 650 (that is, the HPF) between the first diplexer port 610 and the second diplexer port 620 may be referred to as a high-pass branch 655.

A second frequency-selective circuit 660 is coupled between the first diplexer port 610 and the third diplexer port 630. In the example illustrated, the second frequency-selective circuit 660 is a low-pass filter (LPF) that allows transmission of RF signals at LB frequencies, but prevents or substantially rejects the transmission of RF signals at MHB frequencies. The circuit branch including the second frequency-selective circuit 660 (that is, the LPF) between the first diplexer port 610 and the third diplexer port 630 may be referred to as a first low-pass branch 665.

A third frequency-selective circuit 670 is coupled between the fourth diplexer port 640 and the second diplexer port 620. In the example illustrated, the third frequency-selective circuit 670 is an LPF that allows transmission of RF signals at LB frequencies, but prevents or substantially rejects the transmission of RF signals at MHB frequencies. The circuit branch including the third frequency-selective circuit 670 (that is, the LPF) between the fourth diplexer port 640 and the second diplexer port 620 may be referred to as a second low-pass branch 675.

In some examples, the bidirectional diplexer 180 does not include a circuit branch connecting the third diplexer port 630 to the fourth diplexer port 640. Accordingly, the bidirectional diplexer 180 includes one high-pass branch (that is, the high-pass branch 655) and two low-pass branches (that is, the first low-pass branch 665 and the second low-pass branch 675). In this example, the second frequency-selective circuit 660 and the third frequency-selective circuit 670 are complementary to the first frequency-selective circuit 650. It should be noted that the high-pass branch 655 is a bidirectional branch such that RF signals may flow in either direction between the first diplexer port 610 and the second diplexer port 620. The first low-pass branch 665 is also a bidirectional branch such that radio frequency signals may flow in either direction between the first diplexer port 610 and the third diplexer port 630. Similarly, the second low-pass branch 675 is a bidirectional branch such that RF signals may flow in either direction between the fourth diplexer port 640 and the second diplexer port 620.

The high-pass branch 665 provides a relatively short electrical RF signal path between the second transceiver 150 and the second antenna 130 for the transmission of RF signals at MHB frequencies.

Figure 7A:
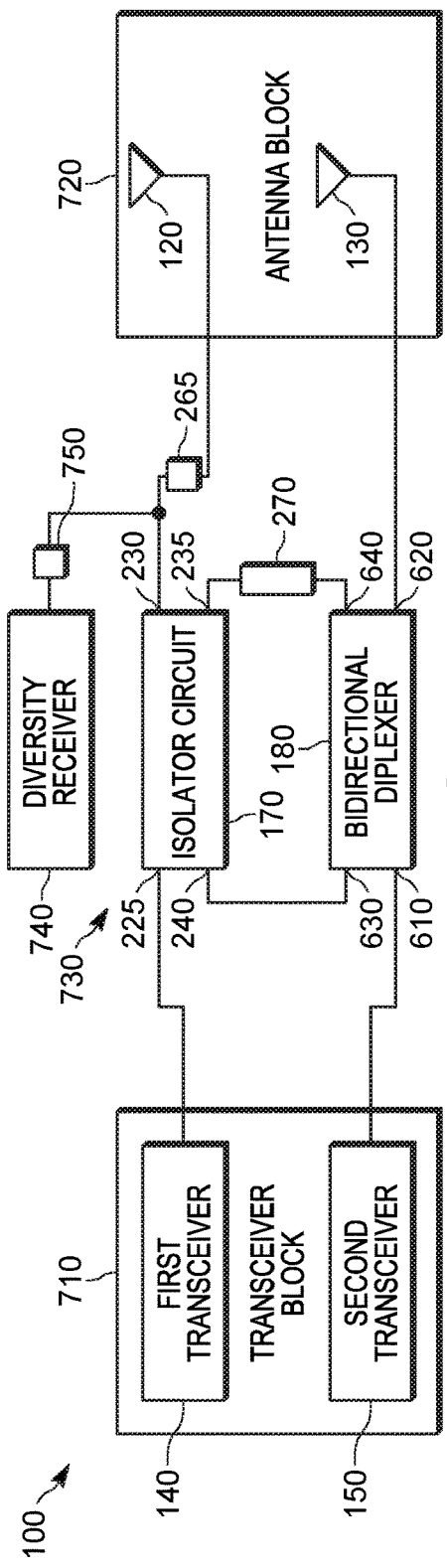
FIGS. 7A and 7B schematically illustrates the bidirectional diplexer of FIG. 6 implemented in the portable communications device of FIG. 1 in accordance with some embodiments.
Figure 7B:
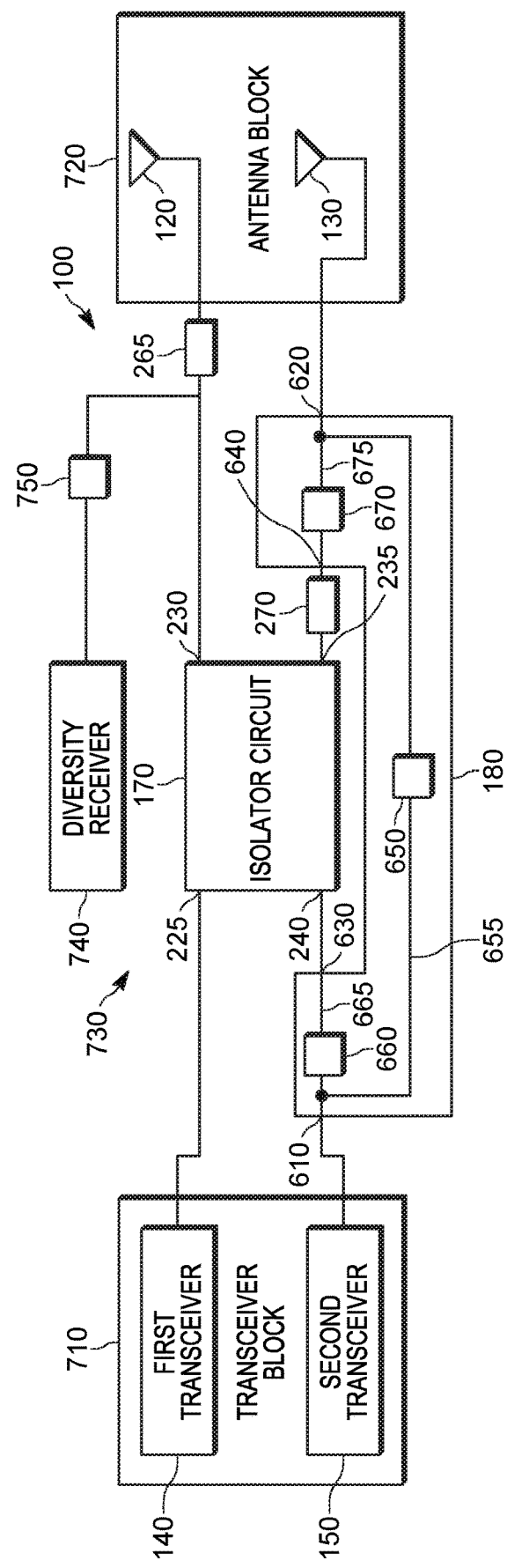

FIGS. 7A and 7B illustrate the portable communications device 100 implementing the bidirectional diplexer 180 according to one example embodiment referred to as the first variant. In the example illustrated, the portable communications device 100 includes a transceiver block 710, an antenna block 720, and a transmission path 730. The transceiver block 710 includes the first transceiver 140 and the second transceiver 150. The antenna block 720 includes the first antenna 120 and the second antenna 130. The transmission path 730 connects the transceiver block 710 to the antenna block 720. That is, the transmission path 730 connects the first transceiver 140 and the second transceiver 150 to the first antenna 120 and the second antenna 130.

The portable communications device 100 includes the isolator circuit 170 provided on the transmission path 730. The isolator circuit 170 is configured to provide isolation between the first transceiver 140 and the second transceiver 150 over the first range of frequencies (for example, LMR 7/800 MHz band) and the second range of frequencies (for example, the LB) as further provided above. The bidirectional diplexer 180 is also provided within the transmission path 730 and is coupled to the second transceiver 150, the isolator circuit 170, and the second antenna 130. The bidirectional diplexer 180 provides a relatively short electrical RF signal path between the second transceiver 150 and the second antenna 130, while concurrently allowing RF signals to flow from the second transceiver 150 to the isolator circuit 170 and from the isolator circuit 170 to the first antenna 120 and the second antenna 130 in the LB.

With reference to FIG. 7B, the first diplexer port 610 is coupled directly to the second transceiver 150, the second diplexer port 620 is coupled to the second antenna 130, the third diplexer port 630 is coupled to the fourth isolator port 240 of the isolator circuit 170, and the fourth diplexer port 640 is coupled to the third isolator port 235 through the second RF transmission line 270. The first isolator port 225 is coupled directly to the first transceiver 140, the second isolator port 230 is coupled to the first antenna 120 through the first RF transmission line 265, the fourth isolator port 240 is coupled to the second transceiver 150 through the first low-pass branch 665, and the third isolator port 235 is coupled to the second antenna 130 through the second RF transmission line 270 and the second low-pass branch 675. Accordingly, the first low-pass branch 665 couples the second transceiver 150 to the fourth isolator port 240 of the isolator circuit 170, the second low-pass branch 675 couples the third isolator port 235 of the isolator circuit 170, via the second RF transmission line 270, to the second antenna 130, and the high-pass branch 655 directly couples the second transceiver 150 to the second antenna 130 bypassing the isolator circuit 170.

During operation, when the second transceiver 150 is operating in the LB, the high-pass branch 655 prevents or substantially rejects the LB RF signals from being transmitted directly to the second antenna 130. Instead, the LB RF signals pass through the first low-pass branch 665, the isolator circuit 170, the second RF transmission line 270, the second low-pass branch 675, and on to the second antenna 130. The LB RF signals may also pass through the first low-pass branch 665, the isolator circuit 170, the first RF transmission line 265, and on to the first antenna 120. The VHF band, UHF band, and 7/800 MHz band RF signals from the first transceiver 140 pass through the isolator circuit 170 and the first RF transmission line 265 and onto the first antenna 120. The VHF band, UHF band, and 7/800 MHz band RF signals may also pass through the isolator circuit 170, the second RF transmission line 270, the second low-pass branch 675, and on to the second antenna 130. Because the 7/800 MHz band RF signals from the first transceiver 140 and the LB RF signals from the second transceiver 150 pass through the isolator circuit 170, substantial RF isolation is provided between the first transceiver 140 and the second transceiver 150 across the LB and the 7/800 MHz band. The VHF/UHF band RF signals from the first transceiver 140 pass through the isolator circuit 700, the first RF transmission line 265, the second low-pass branch 675, and on to the first antenna 120.

When the second transceiver 150 is operating in the MHB, the RF isolation between the first transceiver 140 and the second transceiver 150 may be provided using conventional frequency-domain RF filtering and the RF isolation functionality of the isolator circuit 170 may not be needed as the first transceiver 140 and the second transceiver 150 are operating in non-overlapping far-apart frequency bands. The high-pass branch 655 allows the MHB RF signals to be transmitted directly from the second transceiver 150 to the second antenna 130 bypassing the isolator circuit 170. The first low-pass branch 665 prevents or substantially rejects the MHB RF signals from entering the isolator circuit 170 through the fourth isolator port 240. Similarly, the second low-pass branch 675 prevents or substantially rejects the MHB RF signals from entering the isolator circuit 170 through the third isolator port 235. Since the MHB RF signals transmitted from the second transceiver 150 are substantially prevented from entering the isolator circuit 170, the remaining viable RF interference path to the first transceiver 140 is through the RF coupling between the first antenna 120 and the second antenna 130. However, the implementation of analogous conventional frequency-domain RF filtering at the input of the first transceiver 140 provides substantial RF interference mitigation. Due to electromagnetic reciprocity, the implementation of said conventional frequency-domain RF filtering at the input of the second transceiver 150 provides substantial RF interference mitigation when the first transceiver 140 is transmitting.

Figure 8A:
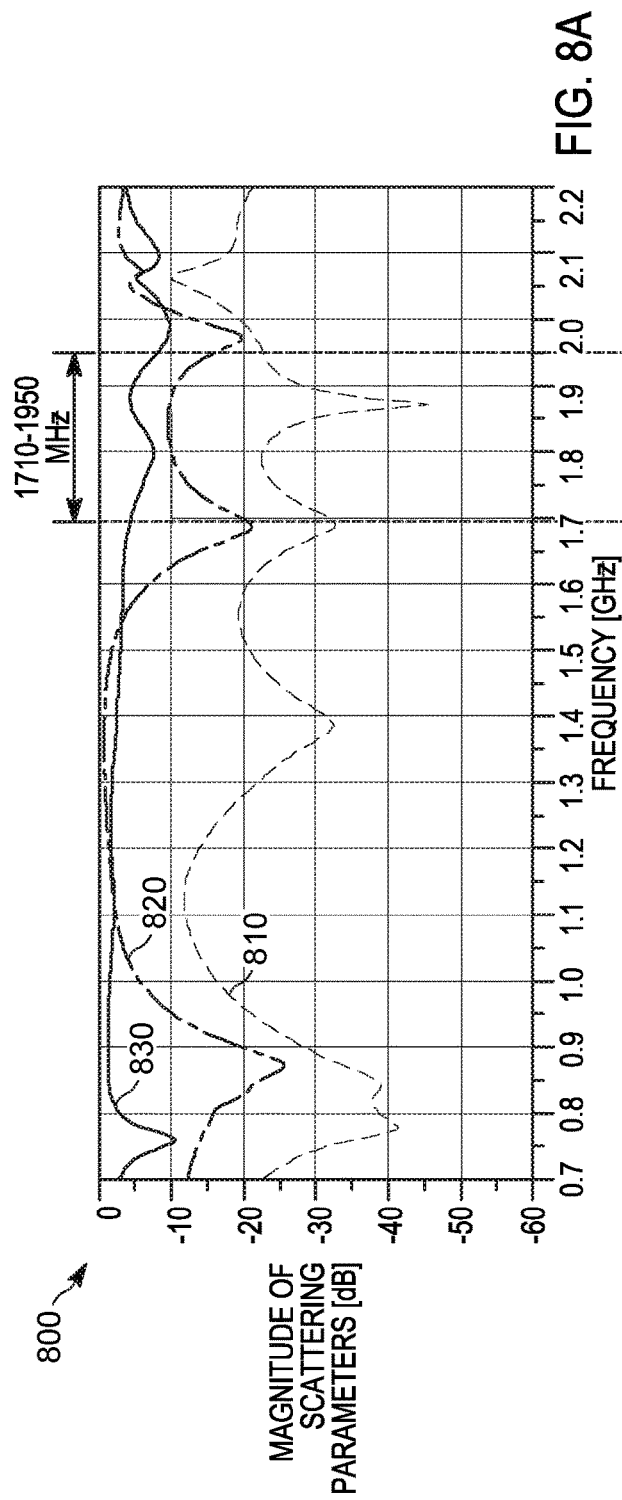
FIGS. 8A and 8B show scattering parameters at input ports of the first transceiver and the second transceiver and fractional share of RF power delivered to a first antenna and a second antenna of the portable communications device of FIGS. 7A and 7B in accordance with some embodiments.
Figure 8B:
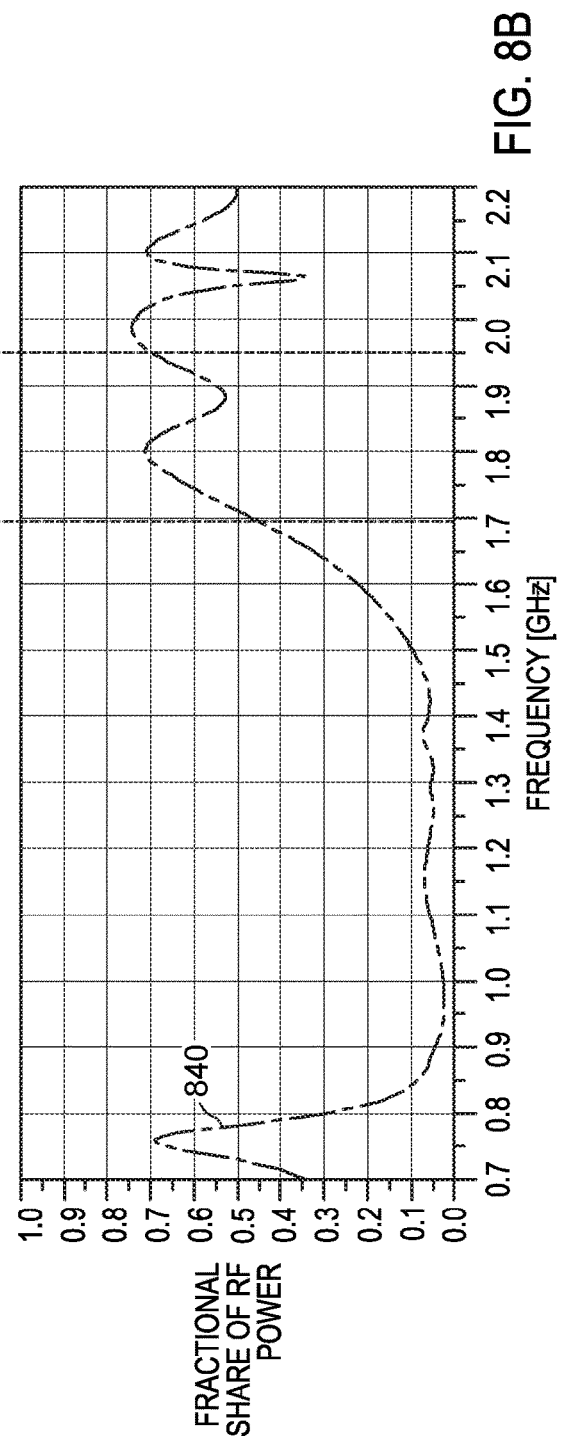

In one example, FIGS. 8A and 8B illustrate the improved MHB performance, relative to the example illustrated in FIGS. 5A and 5B, of the portable communications device 100 when the bidirectional diplexer 180 is employed in conjunction with the isolator circuit 170 according to FIGS. 7A and 7B. FIG. 8A shows dB-scale plots 800 including the plot 810 illustrating the optimized RF isolation between the first transceiver 140 and the second transceiver 150, the plot 820 illustrating the optimized return loss at the first transceiver 140 input, and the plot 830 illustrating the optimized return loss at the second transceiver 150 input, across a frequency range encompassing the LB and the MB. As shown in FIGS. 8A and 8B, the return loss plot 830 at the second transceiver 150 and the plot 840 illustrating the fractional share of available RF power concurrently delivered to the first antenna 120 and the second antenna 130 by the second transceiver 150 are significantly improved in the MB between 1710-1950 MHz, compared with the example illustrated in FIG. 5 relative to a situation in which the bidirectional diplexer 180 is not employed.

In some embodiments, the portable communications device 100 includes a diversity receiver 740 operating in the LTE MHB range that works in conjunction with the second transceiver 150 to increase communication quality over the second wireless communication system 155. The diversity receiver 740 is coupled to the first antenna 120 and the isolator circuit 170 through a fourth frequency-selective circuit 750 (for example, an HPF). The fourth frequency-selective circuit 750 allows MHB RF signals to pass through to the diversity receiver 740 and prevents or substantially rejects LB, VHF, UHF, and 7/800 MHz band RF signals from passing through to the diversity receiver 740. To improve the received RF signal strength at the diversity receiver 740, the second PSN 250 may be designed to reject RF signals MHB frequencies. Accordingly, a separate LTE MHB diversity antenna is not needed for the portable communications device 100 because the diversity receiver 740 may tap into the existing first antenna 120 (that is, the LMR antenna). Additionally, the MHB diversity gain performance over the second wireless communication system 155 is improved because the second transceiver 150 receives through the second antenna 130 and the diversity receiver 740 receives through the first antenna 120.

Figure 9A:
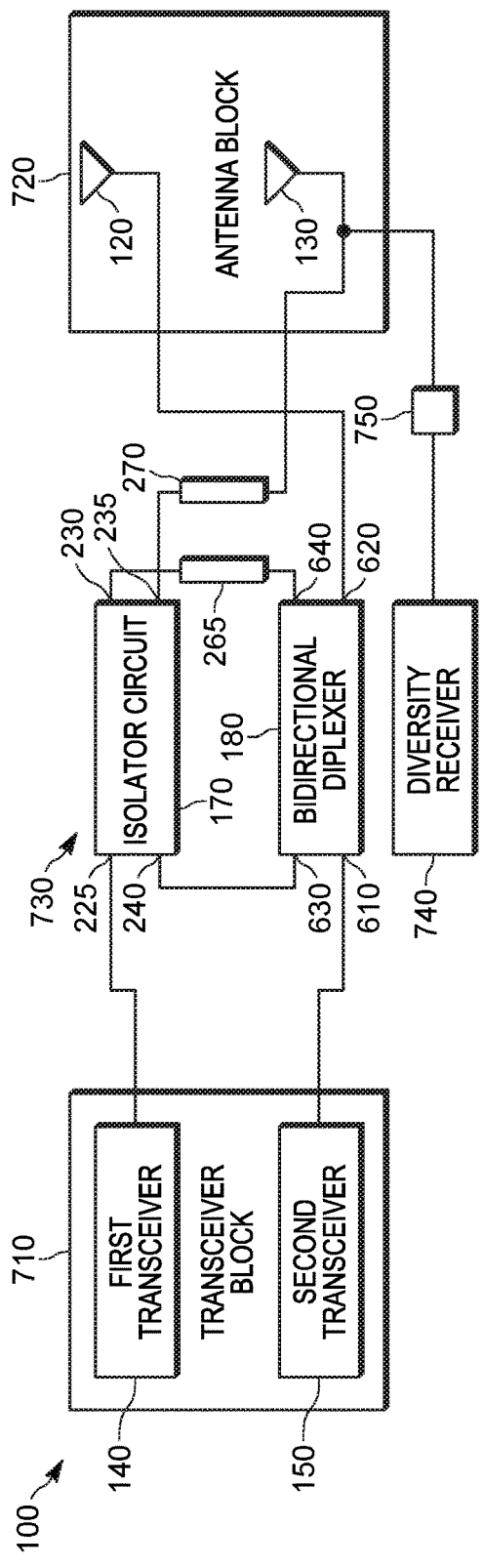
FIGS. 9A and 9B schematically illustrates the bidirectional diplexer of FIG. 6 implemented in the portable communications device of FIG. 1 in accordance with some embodiments.
Figure 9B:
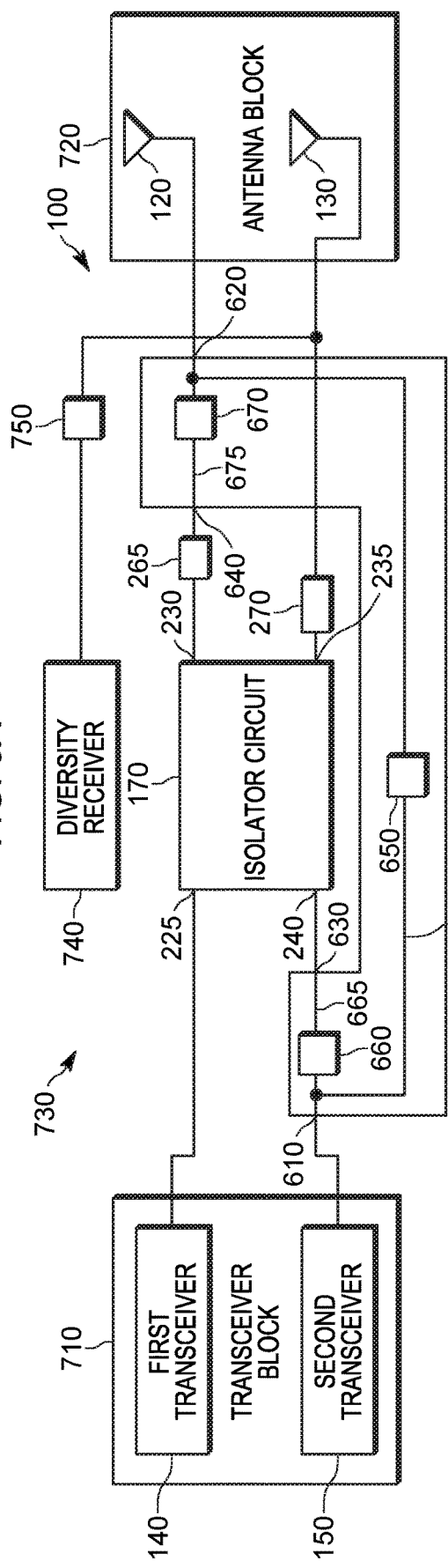

FIGS. 9A and 9B illustrate the portable communications device 100 implementing the bidirectional diplexer 180 according to one example embodiment referred to as the second variant. The second variant is implemented similar to the first variant, but with different connections between the transceiver block 710, the isolator circuit 170, the bidirectional diplexer 180, and the antenna block 720 as further provided below.

With reference to FIG. 9B, the first diplexer port 610 is coupled directly to the second transceiver 150, the second diplexer port 620 is coupled directly to the first antenna 120, the third diplexer port 630 is coupled to the fourth isolator port 240 of the isolator circuit 170, and the fourth diplexer port 640 is coupled to the second isolator port 230 of the isolator circuit 170 through the first RF transmission line 265. The first isolator port 225 is coupled directly to the first transceiver 140, the second isolator port 230 is coupled to the first antenna 120 through the second low-pass branch 675 and the first RF transmission line 265, the fourth isolator port 240 is coupled to the second transceiver 150 through the first low-pass branch 665, and the third isolator port 235 is coupled to the second antenna 130 through the second RF transmission line 270. Accordingly, the first low-pass branch 665 couples the second transceiver 150 to the fourth isolator port 240 of the isolator circuit 170, the second low-pass branch 675 couples the first RF transmission line 265 to the first antenna 120, and the high-pass branch 655 directly couples the second transceiver 150 to the first antenna 120 bypassing the isolator circuit 170.

During operation, when the second transceiver 150 is operating in the LB, the high-pass branch 655 prevents or substantially rejects the LB RF signals from being transmitted directly to the first antenna 120. Rather, the LB RF signals pass through the first low-pass branch 665, the isolator circuit 170, and on to the second antenna 130 through the second RF transmission line 270. The LB RF signals may also pass on to the first antenna 120 through the second low-pass branch 675 and the first RF transmission line 265. The 7/800 MHz band RF signals from the first transceiver 140 pass through the isolator circuit 170, the second low-pass branch 675, the first RF transmission line 265, and on to the first antenna 120, and may also pass on to the second antenna 130 through the second RF transmission line 270. Because the 7/800 MHz band RF signals from the first transceiver 140 and the LB RF signals from the second transceiver 150 pass through the isolator circuit 170 on to both the first antenna 120 and the second antenna 130, improved isolation is provided between the first transceiver 140 and the second transceiver 150 across LB and the 7/800 MHz. As in the first variant, the VHF/UHF band RF signals from the first transceiver 140 pass through the isolator circuit 170, the first RF transmission line 265, the second low-pass branch 675 and on to the first antenna 120.

When the second transceiver 150 is operating in the MHB, the RF isolation between the first transceiver 140 and the second transceiver 150 may be provided using conventional frequency-domain RF filtering and the isolation functionality of the isolator circuit 170 may not be needed as the first transceiver 140 and the second transceiver 150 are operating in far apart, non-overlapping frequency bands. The high-pass branch 655 allows the MHB RF signals to be transmitted from the second transceiver 150 to the first antenna 120 bypassing the isolator circuit 170. The first low-pass branch 665 prevents or substantially rejects the MHB RF signals from entering the isolator circuit 170 through the fourth isolator port 240. Similarly, the second low-pass branch 675 prevents or substantially rejects the MHB RF signals from entering the isolator circuit 170 through the second isolator port 230. Since the MHB RF signals transmitted from the second transceiver 150 are substantially prevented from entering the isolator circuit 170, the only remaining viable RF interference path to the first transceiver 140 is through the RF coupling between the first antenna 120 and the second antenna 130. However, the implementation of the conventional frequency-domain RF filtering at the input of the first transceiver 140 provides substantial RF interference mitigation. Due to electromagnetic reciprocity, the implementation of analogous conventional frequency-domain RF filtering at the input of the second transceiver 150 provides substantial RF interference mitigation when the first transceiver 140 is transmitting.

Accordingly, in the second variant, the LTE MHB operation is substantially provided by the first antenna 120. The first antenna 120 may be designed to support concurrent LMR and LTE operation in respective operating bands. Since the top/external antenna (that is, the first antenna 120) is typically more efficient that the bottom/internal antenna (that is, the second antenna 130), the second variant may avoid implementation of antenna frequency tuning, simplifying the design and reducing the manufacturing cost of the portable communications devices 100. This is because the instantaneous bandwidth of the top/external antenna is sufficient for LMR operation, while concurrently providing better LTE performance than achievable with bottom/internal antenna.

In some embodiments, the portable communications device 100 may include the diversity receiver 740 operating in the LTE MHB range and that works in conjunction with the second transceiver 150 to increase communication quality over the second wireless communication system 155. The diversity receiver 740 is coupled to the second antenna 130 through the fourth frequency-selective circuit 750 (for example, a HPF). The fourth frequency-selective circuit 750 allows MHB RF signals to pass through to the diversity receiver 740 and prevents or substantially rejects LB, VHF, UHF, 7/800 MHz band RF signals from passing through to the diversity receiver 740. To improve the received RF signal strength at the diversity receiver 740, the third PSN 255 may be designed to reject RF signals at MHB frequencies. Accordingly, a separate LTE MHB diversity antenna is not needed for the portable communications device 100 because the diversity receiver 740 may tap into the existing second antenna 130. Additionally, the MHB diversity gain performance over the second wireless communication system 155 is improved because the second transceiver 150 receives through the first antenna 120 and the diversity receiver 740 receives through the second antenna 130.

Figure 10A:
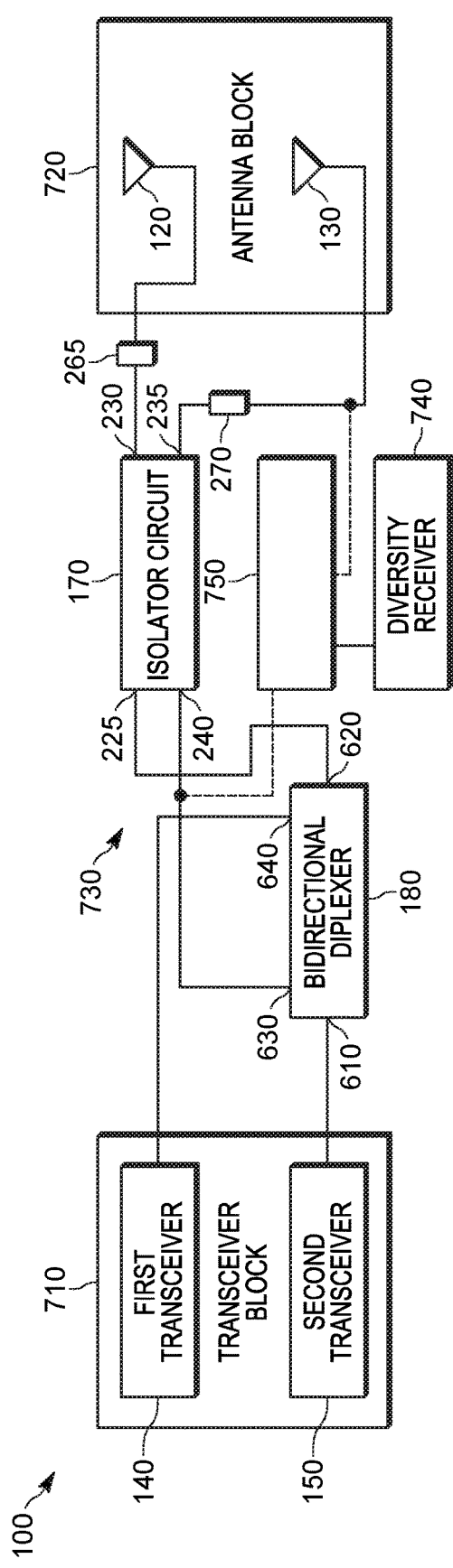
FIGS. 10A and 10B schematically illustrates the bidirectional diplexer of FIG. 6 implemented in the portable communications device of FIG. 1 in accordance with some embodiments.
Figure 10B:
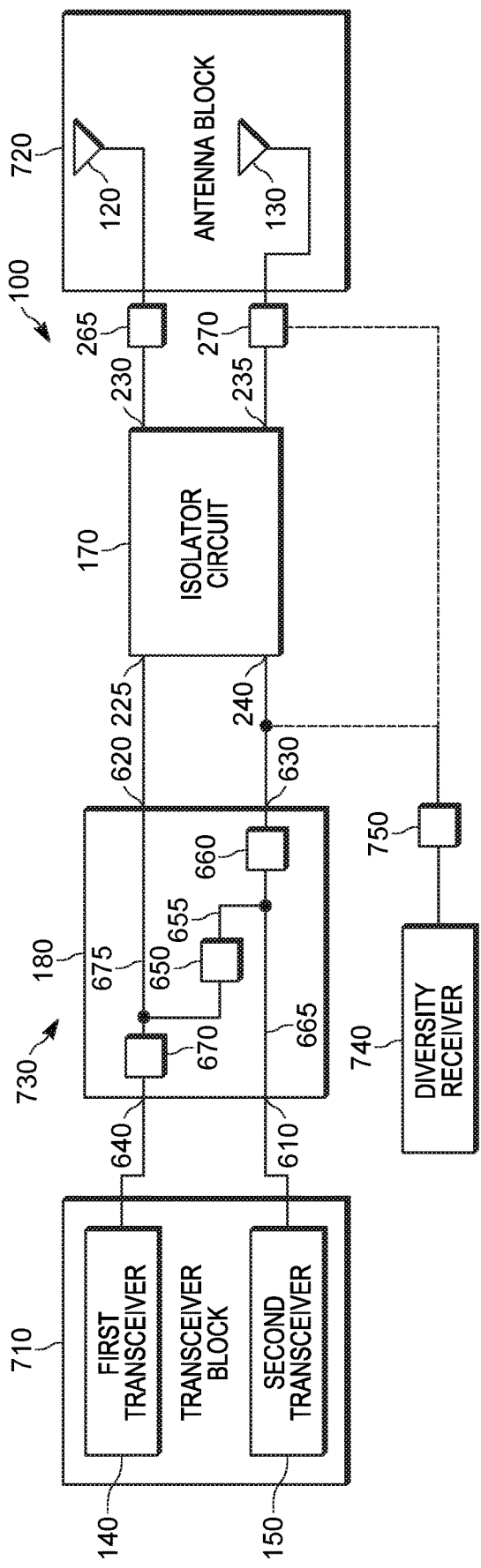

FIGS. 10A and 10B illustrate the portable communications device 100 implementing the bidirectional diplexer 180 according to one example embodiment referred to as the third variant. In relation to the first variant and the second variant, the third variant is implemented with different connections between the transceiver block 710, the isolator circuit 170, the bidirectional diplexer 180, and the antenna block 720 as further provided below.

With reference to FIG. 10B, the first diplexer port 610 is coupled directly to the second transceiver 150, the second diplexer port 620 is coupled to the first isolator port 225 of the isolator circuit 170, the third diplexer port 630 is coupled to the fourth isolator port 240 of the isolator circuit 170, and the fourth diplexer port 640 is coupled directly to the first transceiver 140. The first isolator port 225 is coupled to the first transceiver 140 through the second low-pass branch 675, the second isolator port 230 is coupled to the first antenna 120 through the first RF transmission line 265, the fourth isolator port 240 is coupled to the second transceiver 150 through the first low-pass branch 665, and the third isolator port 235 is coupled to the second antenna 130 through the second RF transmission line 270. Accordingly, the first low-pass branch 665 couples the second transceiver 150 to the fourth isolator port 240 of the isolator circuit 170, the second low-pass branch 675 couples the first transceiver 140 to the first isolator port 225 of the isolator circuit 170, and the high-pass branch 655 couples the second transceiver 150 to the first isolator port 225 of the isolator circuit 170.

During operation, when the second transceiver 150 is operating in the LB, the high-pass branch 655 prevents or substantially rejects the LB RF signals from being transmitted to the first isolator port 225 of the isolator circuit 170. Rather, the LB RF signals pass through the first low-pass branch 665 to the fourth isolator port 240, the isolator circuit 170, and on to the second antenna 130 through the second RF transmission line 270. The LB RF signals may also pass on to the first antenna 120 through the first RF transmission line 265. The 7/800 MHz band RF signals from the first transceiver 140 pass through the second low-pass branch 675 to the first isolator port 225, the isolator circuit 170, and on to the first antenna 120 through the first RF transmission line 265. The 7/800 MHz band RF signals may also pass on to the second antenna 130 through the second RF transmission line 270. Because the 7/800 MHZ band RF signals from the first transceiver 140 and the LB RF signals from the second transceiver 150 pass through the isolator circuit 170 on to both the first antenna 120 and the second antenna 130, improved isolation is provided between the first transceiver 140 and the second transceiver 150 across the LB and the 7/800 MHz band. The VHF/UHF band RF signals from the first transceiver 140 pass through the second low-pass branch 675 the isolator circuit 170, the first RF transmission line 265, and on to the first antenna 120.

When the second transceiver 150 is operating in the MHB, the high-pass branch 655 allows the MHB RF signals to be transmitted from the second transceiver 150 to the first antenna 120 through the first isolator port 224, the isolator circuit 170, and the first RF transmission line 265. The high-pass branch 655 may also allow the MHB RF signals to be transmitted from the second transceiver 150 to the second antenna 130 through the first isolator port 225, the isolator circuit 170, and the second RF transmission line 270. The first low-pass branch 665 prevents or substantially rejects the MHB RF signals from entering the isolator circuit 170 through the fourth isolator port 240. Similarly, the second low-pass branch 675 prevents or substantially rejects the MHB RF signals from entering the first transceiver 140. Since the third frequency-selective circuit 670 (that is, the LPF) prevents or substantially rejects the MHB RF signals from entering the first transceiver 140, the implementation of the conventional frequency-domain RF filtering at the input of the first transceiver 140 may not be required to achieve substantial RF interference mitigation.

Accordingly, in the third variant, the LTE MHB operation is concurrently provided by the first antenna 120 and the second antenna 130. The first antenna 120 may be designed to support concurrent LMR and LTE operation in respective operating bands because the instantaneous bandwidth of the top/external antenna is sufficient for LMR operation, while concurrently providing better LTE performance than with the bottom/internal antenna.

In some embodiments, the portable communications device 100 includes the diversity receiver 740 operating in the LTE MHB range and that works in conjunction with the second transceiver 150 to increase communication quality over the second wireless communication system 155. The diversity receiver 740 may be coupled directly to the second antenna 130 through the fourth frequency-selective circuit 750 (for example, a HPF). Alternatively, the diversity receiver 740 may be coupled to both the first antenna 120 and the second antenna 130 through the fourth frequency-selective circuit 750 coupled to the fourth isolator port 240 and the isolator circuit 170. The fourth frequency-selective circuit 750 allows MHB RF signals to pass through to the diversity receiver 740 and prevents or substantially rejects LB RF signals from passing through to the diversity receiver 740. To improve the received RF signal strength at the diversity receiver 740 when the fourth frequency-selective circuit 750 is coupled directly to the second antenna 130, the third PSN 255 may be designed to reject RF signals at MI-TB frequencies. Accordingly, a separate LTE MHB diversity antenna is not needed for the portable communications device 100 because the diversity receiver 740 may tap into the existing second antenna 130 or, alternatively, the fourth isolator port 240. Additionally, the MHB diversity gain performance over the second wireless communication system 155 is improved because the second transceiver 150 receives through the first isolator port 225 of the isolator circuit 170 and the diversity receiver 740 receives through the second antenna 130 or, alternatively, through the fourth isolator port 240 and the isolator circuit 170.

FIGS. 11A and 11B illustrate the portable communications device 100 implementing the bidirectional diplexer 180 according to one example embodiment referred to as the fourth variant. In relation to the first variant, the second variant, and the third variant, the fourth variant is implemented with different connections between the transceiver block 710, the isolator circuit 170, the bidirectional diplexer 180, and the antenna block 720 as further provided below.

With reference to FIG. 11B, the first diplexer port 610 is coupled directly to the second transceiver 150, the second diplexer port 620 is coupled directly to a third antenna 780 bypassing the isolator circuit 170, the third diplexer port 630 is coupled to the fourth isolator port 240 of the isolator circuit 170, and the fourth diplexer port 640 is coupled to a LB diversity receiver 760. The first isolator port 225 is coupled directly to the first transceiver 140, the second isolator port 230 is coupled to the first antenna 120 through the first RF transmission line 265, the fourth isolator port 240 is coupled to the second transceiver 150 through the first low-pass branch 665, and the third isolator port 235 is coupled to the second antenna 130 through the second RF transmission line 270. Accordingly, the first low-pass branch 665 couples the second transceiver 150 to the fourth isolator port 240 of the isolator circuit 170, the second low-pass branch 675 couples the LB diversity receiver 760 to the third antenna 780 bypassing the isolator circuit 170, and the high-pass branch 655 couples the second transceiver 150 to the third antenna 780 bypassing the isolator circuit 170.

During operation, when the second transceiver 150 is operating in the LB, the high-pass branch 655 prevents or substantially rejects the LB RF signals from being transmitted to the third antenna 780. Rather, the LB RF signals from the second transceiver 150 pass through the first low-pass branch 665, the isolator circuit 170, the second RF transmission line 270 and on to the second antenna 130. The LB RF signals from the second transceiver 150 may also pass on to the first antenna 120 through the first RF transmission line 265. The 7/800 MHz band RF signals from the first transceiver 140 pass through the isolator circuit 170, the first RF transmission line 265, and on to the first antenna 120. The 7/800 MHz band RF signals may also pass on to the second antenna 130 through the second RF transmission line 270. Because the 7/800 MHz Band RF signals from the first transceiver 140 and the LB RF signals from the second transceiver 150 pass through the isolator circuit 170 on to both the first antenna 120 and the second antenna 130, improved isolation is provided between the first transceiver 140 and the second transceiver 150 across the LB and the 7/800 MHz band. At the same time, the LB diversity receiver 760 receives LB RF signals from the third antenna 780 through the second low-pass branch 675. The LB diversity receiver 760 works concurrently with the second transceiver 150 in the LB to increase communication quality over the second wireless communication system 155. The VHF/UHF band RF signals from the first transceiver 140 pass through the isolator circuit 170, the first RF transmission line 265, and on to the first antenna 120.

When the second transceiver 150 is operating in the MHB, the high-pass branch 655 allows the MHB RF signals to be transmitted directly from the second transceiver 150 to the third antenna 780 bypassing the isolator circuit 170. The first low-pass branch 665 prevents or substantially rejects the MHB RF signals from entering the isolator circuit 170 through the third isolator port 235. Similarly, the second low-pass branch 675 prevents or substantially rejects the MHB RF signals from passing through to the LB diversity receiver 760. Accordingly, in the fourth variant, the LTE MHB operation and the LTE LB diversity operation are provided by the third antenna 780. The third antenna 780 may be a multi-band antenna that provides LTE operation in the MHB and diversity LTE operation in the LB. LB diversity LTE operation is therefore provided through the third antenna 780 that supports the MHB LTE operation. Additionally, the LB diversity gain performance over the second wireless communication system 155 is improved because the second transceiver 150 receives LB RF signals through the isolator circuit 170 that is coupled to both the first antenna 120 and the second antenna 130, and the LB diversity receiver 760 receives LB RF signals through the third antenna 780.

In some embodiments, the portable communications device 100 includes the diversity receiver 740 operating in the LTE MHB range and that works in conjunction with the second transceiver 150 to increase communication quality over the second wireless communication system 155. The diversity receiver 740 may be coupled to the first antenna 120 or the second antenna 130 through the fourth frequency-selective circuit 750 (for example, a HPF). The fourth frequency-selective circuit 750 allows MHB RF signals to pass through to the diversity receiver 740 and prevents or substantially rejects LB RF signals from passing through to the diversity receiver 740. Accordingly, a separate LTE MHB diversity antenna is not needed for the portable communications device 100 because the diversity receiver 740 may tap into the existing first antenna 120 or the existing second antenna 130. To improve the received RF signal strength at the diversity receiver 740 when the fourth frequency-selective circuit 750 is coupled directly to the first antenna 120 or the second antenna 130, the second (third) PSN 250 (255) may be designed to reject RF signals at MHB frequencies. Additionally, the MHB diversity gain performance over the second wireless communication system 155 is improved because the second transceiver 150 receives through the third antenna 780 and the diversity receiver 740 receives through the first antenna 120 or the second antenna 130.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable communications device comprising:
    a first antenna;
    a second antenna;
    a first transceiver configured to operate over a first range of frequencies;
    a second transceiver configured to operate over a second range of frequencies and a third range of frequencies;
    a transmission path connecting the first transceiver and the second transceiver to the first antenna and the second antenna;
    an isolator circuit provided on the transmission path and configured to provide isolation between the first transceiver and the second transceiver when the second transceiver is operating in the second range of frequencies; and
    a bidirectional diplexer provided on the transmission path, the bidirectional diplexer coupled to the second transceiver and the isolator circuit and configured to reduce an electrical transmission length when the second transceiver is operating over the third range of frequencies, wherein the bidirectional diplexer includes
        a first frequency-selective circuit coupled between a first diplexer port and a second diplexer port;
        a second frequency-selective circuit coupled between the first diplexer port and a third diplexer port; and
        a third frequency-selective circuit coupled between a fourth diplexer port and the second diplexer port.

2. The portable communications device of claim 1, wherein the first frequency-selective circuit is a high-pass filter and the second frequency-selective circuit and the third frequency-selective circuit are low-pass filters.

3. The portable communications device of claim 1, wherein the second frequency-selective circuit and the third frequency-selective circuit are complementary to the first frequency-selective circuit.

4. The portable communications device of claim 1, wherein the first diplexer port is coupled to the second transceiver, the third diplexer port is coupled to the isolator circuit, the fourth diplexer port is coupled to the isolator circuit, and the second diplexer port is coupled to the second antenna.

5. The portable communications device of claim 1, wherein the first diplexer port is coupled to the second transceiver, the third diplexer port is coupled to the isolator circuit, the fourth diplexer port is coupled to the isolator circuit, and the second diplexer port is coupled to the first antenna.

6. The portable communications device of claim 1, wherein the first diplexer port is coupled to the second transceiver, the third diplexer port is coupled to the isolator circuit, the fourth diplexer port is coupled to the first transceiver, and the second diplexer port is coupled to the isolator circuit.

7. The portable communications device of claim 1, wherein the first diplexer port is coupled to the second transceiver, the third diplexer port is coupled to the isolator circuit, the fourth diplexer port is coupled to a diversity receiver, and the second diplexer port is coupled to a third antenna.

8. The portable communications device of claim 1, wherein the bidirectional diplexer allows radio frequency signals from the second transceiver to pass through to the isolator circuit when the second transceiver is operating over the second range of frequencies and wherein the bidirectional diplexer allows radio frequency signals from the second transceiver to bypass the isolator circuit when the second transceiver is operating over the third range of frequencies.

9. The portable communications device of claim 1, wherein the first transceiver is a land mobile radio (LMR) transceiver and the second transceiver is long term evolution (LTE) transceiver.

10. A portable communications device comprising:
a first antenna;
a second antenna;
a first transceiver configured to operate over a first range of frequencies;
a second transceiver configured to operate over a second range of frequencies and a third range of frequencies;
an isolator circuit coupling the first transceiver and the second transceiver to the first antenna and the second antenna and configured to provide isolation between the first transceiver and the second transceiver when the second transceiver is operating in the second range of frequencies; and
a bidirectional diplexer coupling the second transceiver to the isolator circuit and configured to reduce an electrical transmission length when the second transceiver is operating over the third range of frequencies, wherein the bidirectional diplexer includes
a first frequency-selective circuit coupled between a first diplexer port and a second diplexer port;
a second frequency-selective circuit coupled between the first diplexer port and a third diplexer port; and
a third frequency-selective circuit coupled between a fourth diplexer port and the second diplexer port.

11. The portable communications device of claim 10, wherein the first frequency-selective circuit is a high-pass filter and the second frequency-selective circuit and the third frequency-selective circuit are low-pass filters.

12. The portable communications device of claim 10, wherein the second frequency-selective circuit and the third frequency-selective circuit are complementary to the first frequency-selective circuit.

13. The portable communications device of claim 10, wherein the first diplexer port is coupled to the second transceiver, the third diplexer port is coupled to the isolator circuit, the fourth diplexer port is coupled to the isolator circuit, and the second diplexer port is coupled to the second antenna.

14. The portable communications device of claim 10, wherein the first diplexer port is coupled to the second transceiver, the third diplexer port is coupled to the isolator circuit, the fourth diplexer port is coupled to the isolator circuit, and the second diplexer port is coupled to the first antenna.

15. The portable communications device of claim 10, wherein the first diplexer port is coupled to the second transceiver, the third diplexer port is coupled to the isolator circuit, the fourth diplexer port is coupled to the first transceiver, and the second diplexer port is coupled to the isolator circuit.

16. The portable communications device of claim 10, wherein the first diplexer port is coupled to the second transceiver, the third diplexer port is coupled to the isolator circuit, the fourth diplexer port is coupled to a diversity receiver, and the second diplexer port is coupled to a third antenna.

17. The portable communications device of claim 10, wherein the bidirectional diplexer allows radio frequency signals from the second transceiver to pass through to the isolator circuit when the second transceiver is operating over the second range of frequencies and wherein the bidirectional diplexer allows radio frequency signals from the second transceiver to bypass the isolator circuit when the second transceiver is operating over the third range of frequencies.

18. The portable communications device of claim 10, wherein the first transceiver is a land mobile radio (LMR) transceiver and the second transceiver is long term evolution (LTE) transceiver.

19. A portable communications device comprising:
a first antenna;
a second antenna;
a first transceiver configured to operate over a first range of frequencies;
a second transceiver configured to operate over a second range of frequencies and a third range of frequencies;
a transmission path connecting the first transceiver and the second transceiver to the first antenna and the second antenna;
an isolator circuit provided on the transmission path and configured to provide isolation between the first transceiver and the second transceiver when the second transceiver is operating in the second range of frequencies; and
a bidirectional diplexer provided on the transmission path, the bidirectional diplexer coupled to the second transceiver and the isolator circuit and configured to reduce an electrical transmission length when the second transceiver is operating over the third range of frequencies, wherein the bidirectional diplexer allows radio frequency signals from the second transceiver to pass through to the isolator circuit when the second transceiver is operating over the second range of frequencies and wherein the bidirectional diplexer allows radio frequency signals from the second transceiver to bypass the isolator circuit when the second transceiver is operating over the third range of frequencies.

20. The portable communications device of claim 19, wherein the first transceiver is a land mobile radio (LMR) transceiver and the second transceiver is long term evolution (LTE) transceiver.

* * * * *